US012784025B2

(12) United States Patent
Sano

(10) Patent No.: US 12,784,025 B2
(45) Date of Patent: Nov. 3, 2026

(54) SERVER AND METHOD

(71) Applicant: Toshiba Tec Kabushiki Kaisha, Tokyo (JP)

(72) Inventor: Takeshi Sano, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 613 days.

(21) Appl. No.: 18/158,477

(22) Filed: Jan. 24, 2023

(65) Prior Publication Data

US 2023/0281592 A1 Sep. 7, 2023

(30) Foreign Application Priority Data

Jan. 25, 2022 (JP) ................................ 2022-009450

(51) Int. Cl.
*G06Q 20/20* (2012.01)
*G06Q 20/04* (2012.01)
*G06Q 20/32* (2012.01)

(52) U.S. Cl.
CPC ......... *G06Q 20/208* (2013.01); *G06Q 20/202* (2013.01); *G06Q 20/3276* (2013.01); *G06Q 20/047* (2020.05)

(58) Field of Classification Search
CPC ............... G06Q 20/208; G06Q 20/202; G06Q 20/3276; G06Q 20/047; G07G 1/0072; G07G 1/14
USPC ........................................................... 705/21
See application file for complete search history.

(56) References Cited

U.S. PATENT DOCUMENTS

2015/0083805 A1* 3/2015 Sato ....................... G06Q 10/08 235/383
2021/0326828 A1* 10/2021 Enatsu ............... G06Q 20/3276

FOREIGN PATENT DOCUMENTS

JP 2020042462 A 3/2020
JP 2021140608 A 9/2021

OTHER PUBLICATIONS

Yu-Kwong Ricky Kwok et al. Wireless Internet and Mobile Computing: Interoperability and Performance. Wiley-IEEE Press, 2007. (Year: 2007).*
Xia, Kun et al. An Intelligent Self-Service Vending System for Smart Retail. Sensors, Basel, Switzerland, 2021. (Year: 2021).*

* cited by examiner

*Primary Examiner* — Fawaad Haider
(74) *Attorney, Agent, or Firm* — Kim & Stewart LLP

(57) ABSTRACT

A registration server in a POS system including a weighing device for weighing a commodity sold by weight in a store and a mobile terminal operated by a customer for managing registered commodities, includes a network interface connectable to the weighing device and the mobile terminal, a memory, and a processor. The processor is configured to, upon receipt of identification information identifying the weighing device from the mobile terminal, control the network interface to establish a connection with the weighing device, acquire commodity information indicating the weighed commodity and a weight thereof from the weighing device, register in the memory the weighed commodity as a commodity to be purchased by the customer, control the network interface to output the commodity information to the mobile terminal, and maintain the connection with the weighing device until an instruction for disconnecting the connection is received from the weighing device.

15 Claims, 16 Drawing Sheets

1

Mc

34

WEIGHING DEVICE CODE: aaa 35 36 37 38 39

| COMMODITY CODE | COMMODITY NAME | UNIT PRICE | WEIGHT | PRICE |
|---|---|---|---|---|
| bbb | ccc | ddd | eee | fff |
| . . . | . . . | . . . | . . . | . . . |

FIG. 8

SERVER AND METHOD

CROSS-REFERENCE TO RELATED APPLICATION(S)

This application is based on and claimed the benefit of priority from Japanese patent application No. 2022-009450, filed, Jan. 25, 2022, the entire contents of which are incorporated herein by reference.

FIELD

Embodiments described herein relate generally to a server and a method performed by a smartphone point of sale (POS) system and a cart POS system.

BACKGROUND

Conventionally, there is a weighing device that weighs a commodity sold by weight (hereinafter referred to as a weighed commodity) such as meat whose price varies according to its weight specified by customer.

In such a conventional weighing device, a connection is established between the weighing device and a server for each weighed commodity to be purchased. Therefore, when a plurality of commodities to be weighed are continuously purchased, it is necessary to repeat connection and disconnection between the weighing device and the server for each transaction, which is troublesome.

BRIEF DESCRIPTION OF THE DRAWINGS

FIG. 8 is a diagram showing a configuration of a commodity registration file.

DETAILED DESCRIPTION

According to one embodiment, a registration server in a point of sale (POS) system including a weighing device for weighing a commodity that is sold by weight in a store and a mobile terminal operated by a customer for managing one or more registered commodities including the weighed commodity, includes a network interface connectable to the weighing device and the mobile terminal, a memory, and a processor. The processor is configured to, upon receipt of identification information identifying the weighing device from the mobile terminal, control the network interface to establish a connection with the weighing device, acquire commodity information indicating the weighed commodity and a weight thereof from the weighing device, register in the memory the weighed commodity as a commodity to be purchased by the customer, control the network interface to output the commodity information to the mobile terminal, and maintain the connection with the weighing device until an instruction for disconnecting the connection is received from the weighing device.

Embodiments of the present disclosure will be described with reference to the drawings.

First Embodiment

Figure 1:
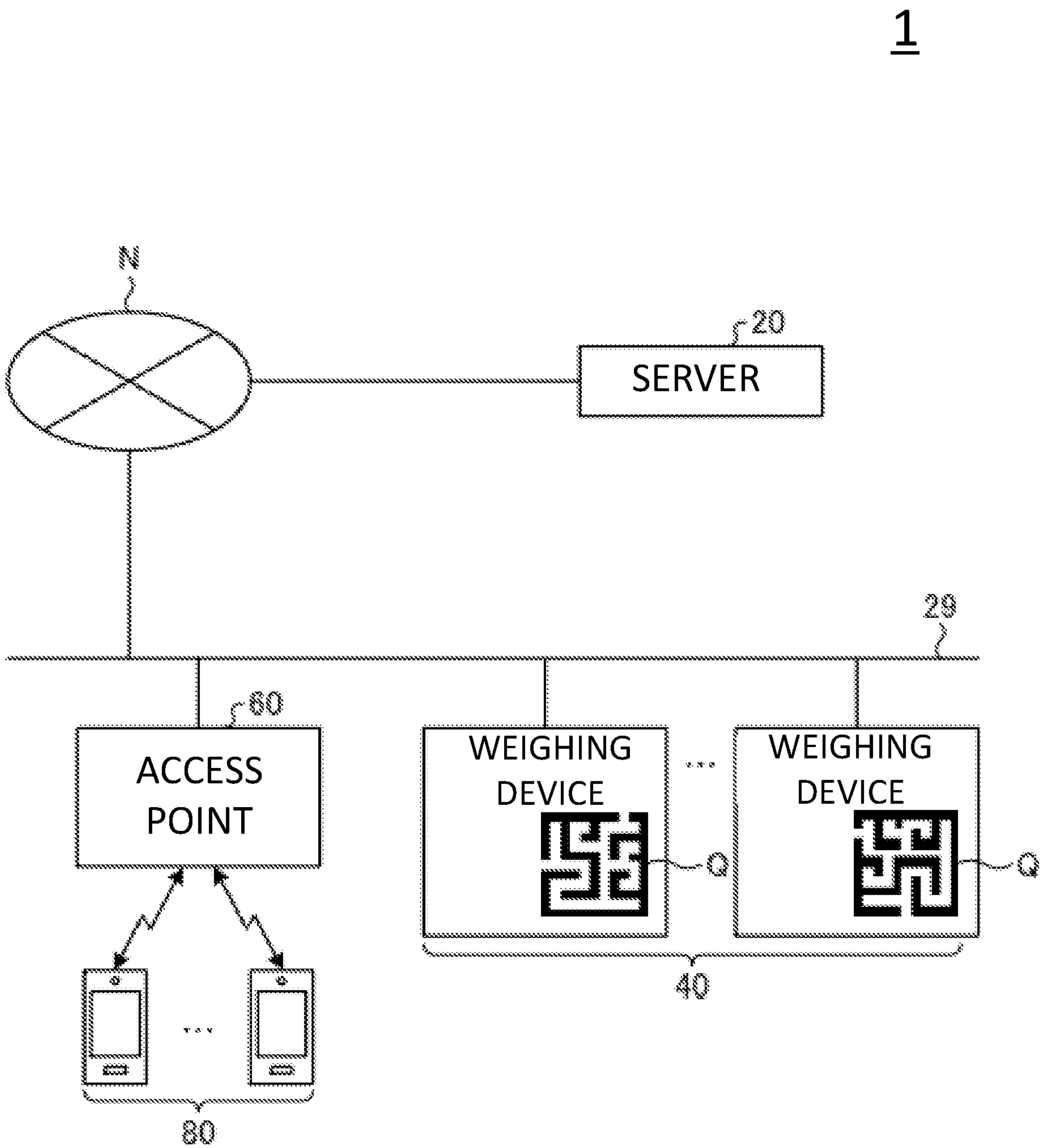
FIG. 1 is a system block diagram showing a system configuration of a POS system according to a first embodiment.

A system configuration of a POS system 1 according to a first embodiment will be described with reference to FIG. 1. FIG. 1 is a system block diagram showing a system configuration of the POS system 1 according to the first embodiment.

The POS system 1 is a system that performs commodity registration processing and payment processing for weighed commodities. The POS system 1 includes a server 20, one or more weighing devices 40, and one or more mobile terminals 80.

The server 20 establishes communication with a weighing device 40 for weighing a commodity, and acquires commodity information for specifying the weighed commodity and the weight thereof from the weighing device 40. The server 20 registers the commodity information and the weight acquired from the weighing device 40, and transmits the registration result to the mobile terminal 80 associated with the customer who is purchasing the weighed commodity. Further, the server 20 disconnects the communication with the weighing device 40.

Further, the server 20 performs a payment process based on the registered commodity information of the weighed commodity and the weight thereof, and generates an electronic receipt including the payment result. In addition, the server 20 outputs the generated electronic receipt to the mobile terminal 80 associated with the customer who has purchased the weighed commodity. In the present embodiment, the server 20 is described as having all of the functions described above, but some of the functions described above may be performed by another server. For example, the server 20 may be divided into a server that manages commodity information measured by the weighing device 40 and a server that performs the payment process.

The weighing device 40 specifies a weighed commodity, measures the weight thereof, and calculates a purchase price. The weighing device 40 establishes or disconnects communication with the server 20 in response to a connection instruction or a disconnection instruction from the server 20. Further, the weighing device 40 outputs information for uniquely specifying the weighed commodity and the weight thereof to the server 20. A code symbol Q (hereinafter referred to as "identification code") including identification information for uniquely specifying each weighing device 40 is attached thereto. For example, a plurality of weighing devices 40 are provided in a store, and a customer purchases a commodity to be weighed at an available weighing device 40. Since the server 20 can be connected to a plurality of weighing devices 40 installed in different stores, the code symbol Q includes identification information that can identify the store in which the weighing device 40 is installed.

The mobile terminal 80 is carried by a customer, and reads a code symbol Q (i.e., an identification code) for uniquely specifying a weighing device 40 at the weighing device 40 where the customer purchases a weighed commodity. The code symbol Q is, for example, a bar code or a two-dimensional code that is attached to the housing of the weighing device 40 and includes identification information for uniquely specifying the weighing device 40. Further, the mobile terminal 80 outputs the identification information included in the read code symbol Q to the server 20. Further, the mobile terminal 80 acquires the registered commodity information from the server 20. Further, the mobile terminal 80 outputs information for instructing execution of the payment processing to the server 20. Further, the mobile terminal 80 acquires an electronic receipt indicating a result of the payment from the server 20.

The server 20 communicates with the weighing device 40 via the in-store network 29 and the network N.

The mobile terminal 80 communicates with the server 20 via an access point 60 provided in the store, an in-store network 29, and a network N.

Figure 2:
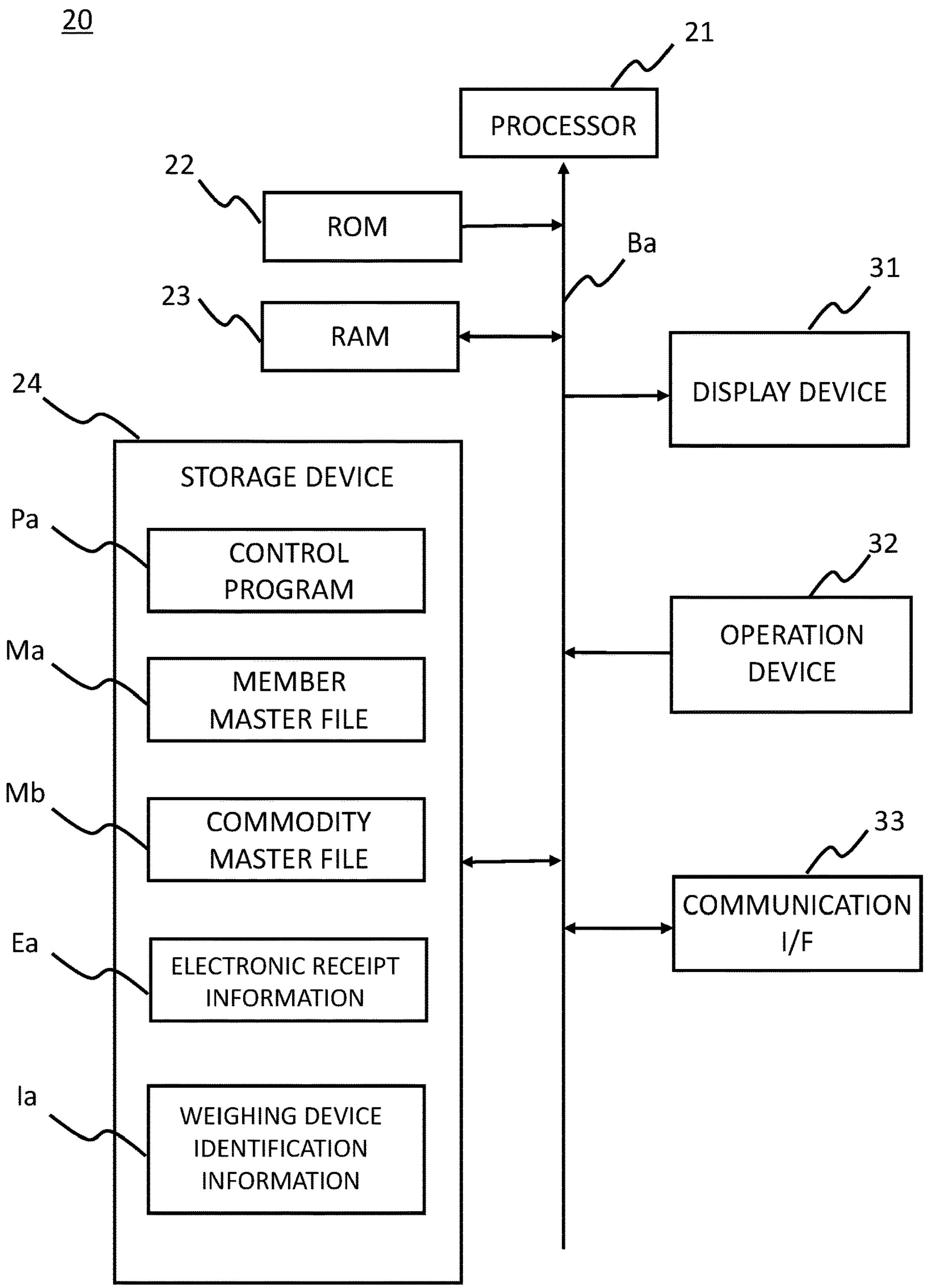
FIG. 2 is a hardware block diagram showing a hardware configuration of a server according to a first embodiment.

A hardware configuration of the server 20 will be described with reference to FIG. 2. FIG. 2 is the hardware block diagram showing the hardware configuration of the server 20.

The server 20 includes a processor 21 for controlling each part of the server 20. The server 20 includes a read only memory (ROM) 22 and a random access memory (PAM) 23. The processor 21 is connected to the ROM 22 and the RAM 23 via an internal bus Ba such as an address bus and a data bus. The processor 21 loads various programs stored in the ROM 22 or a storage device 24 onto the RAM 23. The processor 21 controls the server 20 by executing various programs loaded onto the RAM 23.

The processor 21 is connected to the storage device 24, a display device 31, an operation device 32, and a communication interface (I/F) 33 via the internal bus Ba.

For example, the storage device 24 is a hard disk drive (HDD) or a solid state drive (SSD). In addition, the storage device 24 may be a nonvolatile memory such as a flash memory in which stored information is retained even when power is turned off. The storage device 24 stores a control program Pa, a member master file Ma, a commodity master file Mb, electronic receipt information Ea, and weighing device identification information Ia.

The control program Pa is a program for controlling the overall operation of the server 20.

The member master file Ma stores attribute information such as the member codes of a plurality of members who can use an electronic receipt system and email addresses of the members who possess the mobile terminals 80. These pieces of information are registered by each member.

The commodity master file Mb is a master file that stores commodity information of a commodity to be weighed, that is, a commodity code, a commodity name, a price per unit weight, e.g., gram or pound, and the like. Here, the operation of the system 1 at the time of purchasing a weighed commodity will be described, but the server 20 also performs payment processing of general commodities that are not weighed for purchase. Therefore, the commodity master file Mb stores commodity information related to not only weighed commodities but general commodities.

The electronic receipt information Ea is electronic receipt information generated based on a result of a payment process performed by the server 20. The electronic receipt information Ea includes commodity information of a sold commodity, details of the payment, information of a store in which the payment is performed, and the like.

The weighing device identification information Ia is identification information that is assigned to each weighing device 40 and uniquely identifies the weighing device 40. The weighing device identification information Ia includes, for example, a serial number of the weighing device 40. Since the server 20 is connected to a plurality of weighing devices 40 installed in different stores, the weighing device identification information Ia may further include a store code or the like capable of uniquely specifying the store in which the weighing device 40 is installed.

The display device 31 displays a screen generated by an instruction of the processor 21. For example, the display device 31 is an LCD (Liquid Crystal Display) or an organic EL (Electro-Luminescence).

The operation device 32 accepts an input operation by the operator and issues a signal indicating the input operation and detectable by the processor 21. The operation device 32 is constituted by input devices such as a touch panel and a keyboard.

The communication interface 33 is an interface for communicating with the weighing device 40 and the mobile terminal 80 via wireless communication such as a wireless LAN (local area network) or wired communication such as a wired LAN.

Figure 3:
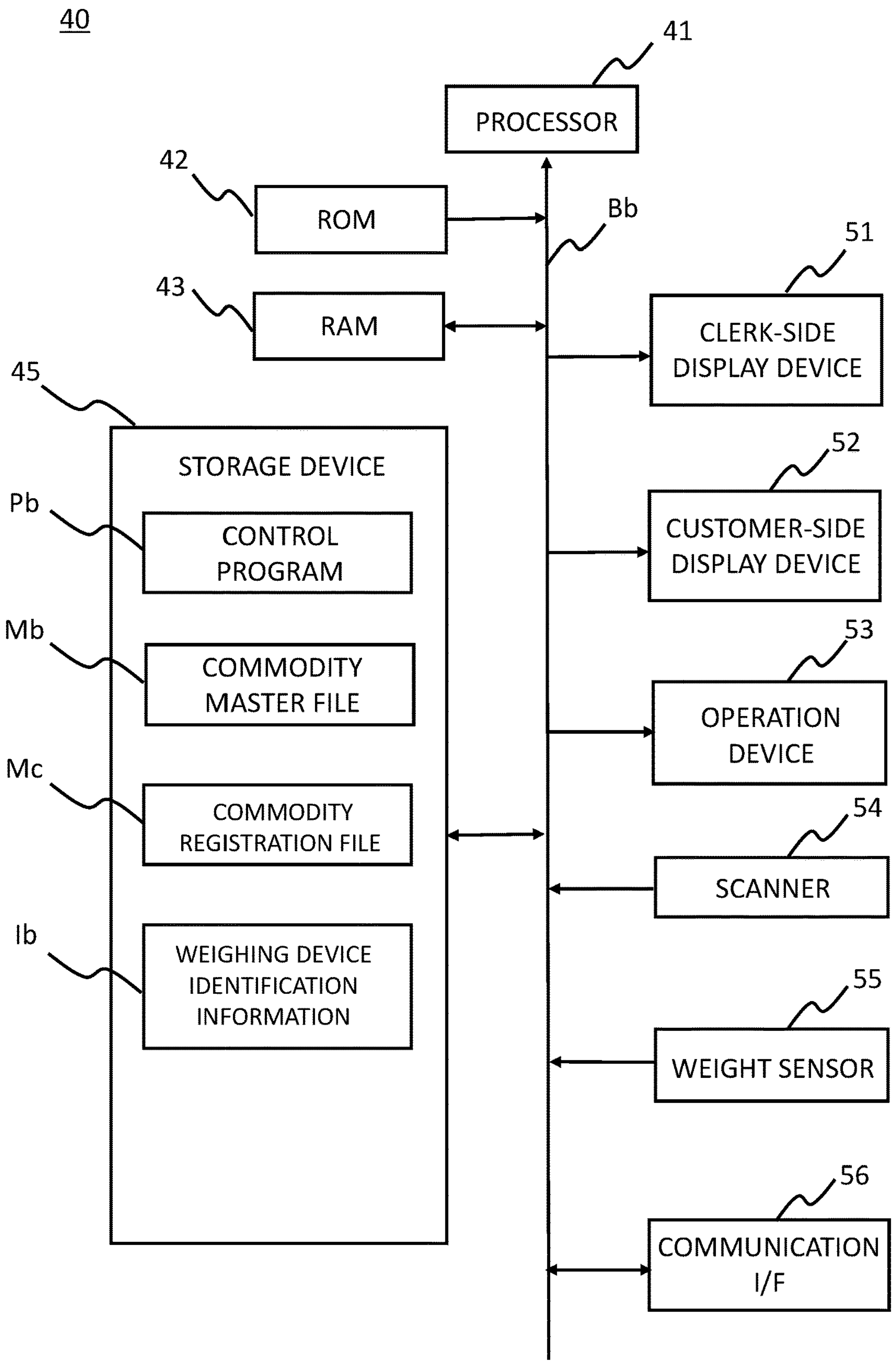
FIG. 3 is a hardware block diagram showing a hardware configuration of a weighing device according to a first embodiment.

The hardware configuration of the weighing device 40 will be described with reference to FIG. 3. FIG. 3 is a hardware block diagram showing a hardware configuration of the weighing device 40.

The weighing device 40 includes a processor 41 for controlling each part of the weighing device 40. The weighing device 40 includes a ROM 42 and a ROM 43. The processor 41 is connected to the ROM 42 and the ROM 43 via an internal bus Bb such as an address bus and a data bus. The processor 41 loads various programs stored in the ROM 42 or a storage device 45 onto the ROM 43. The processor 41 controls the weighing device 40 by executing various programs loaded onto the ROM 43.

The processor 41 is connected to the storage device 45, a store clerk-side display device 51, a customer-side display device 52, an operation device 53, a scanner 54, a weight sensor 55, and a communication interface (I/F) 56 via the internal bus Bb.

For example, the storage device 45 is an HDD or an SSD. In addition, the storage device 45 may be a nonvolatile memory such as a flash memory in which stored information is retained even when power is turned off. The storage device 45 stores a control program Pb, a commodity master file Mb, a commodity registration file Mc, and a weighing device identification information Ib.

The control program Pb is a program for controlling the entire operation of the weighing device 40.

The commodity master file Mb is a master file in which commodity information of a weighed commodity is stored. Since the content of the commodity master file Mb is updated at any time, the weighing device 40 acquires the latest commodity master file Mb from, for example, the server 20.

The commodity registration file Mc is a file storing the result of weighing by the weighing device 40. The commodity registration file Mc will be described in detail later with reference to FIG. 8.

The weighing device identification information Ib is identification information for uniquely specifying the weighing device 40.

The clerk-side display device 51 displays a screen generated by an instruction of the processor 41 to a store clerk. The clerk-side display device 51 is a device such as an LCD or an organic EL.

The customer-side display device 52 displays a screen generated by an instruction of the processor 41 to a customer. The customer-side display device 52 is a device such as an LCD or an organic EL, for example.

The operation device 53 accepts an input operation by the operator and issues a signal indicating the input operation and detectable by the processor 41. The operation device 53 is composed of devices such as a keyboard and a touch panel. The operation device 53 may be provided on both the store clerk side and the customer side.

The scanner 54 reads an identification code (for example, a bar code) corresponding to a weighed commodity designated by a customer for registration.

The weight sensor 55 measures the weight of a weighed commodity. The weight sensor 55 is, for example, a load cell.

The communication interface (I/F) 56 is an interface for communicating with the server 20 via wireless communication such as a wireless LAN or wired communication such as a wired LAN.

Figure 4:
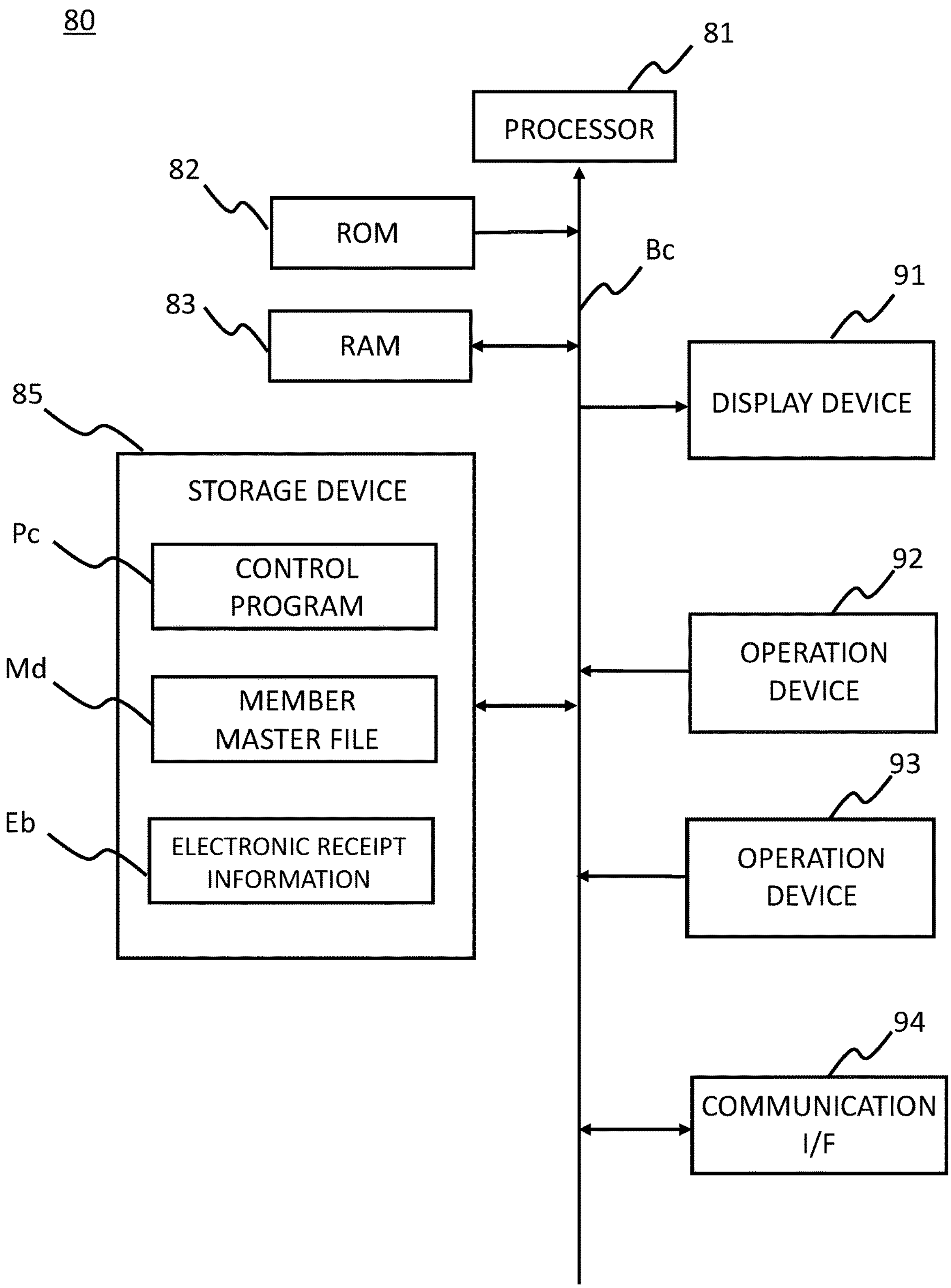
FIG. 4 is a hardware block diagram showing a hardware configuration of a mobile terminal according to a first embodiment.

A hardware configuration of the mobile terminal 80 will be described with reference to FIG. 4. FIG. 4 is a hardware block diagram showing a hardware configuration of the mobile terminal 80.

The mobile terminal 80 includes a processor 81 for controlling each unit of the mobile terminal 80. The mobile terminal 80 includes a ROM 82 and a RAM 83. The processor 81 is connected to the ROM 82 and the RAM 83 via an internal bus Bc such as an address bus and a data bus. The processor 81 loads various programs stored in the ROM 82 or a storage device 85 onto the RAM 83. The control processor 81 controls the mobile device 80 by executing various programs loaded onto the RAM 83.

The processor 81 is connected to the storage device 85, a display device 91, an operation device 92, a camera 93, and a communication interface (I/F) 94 via the internal bus Bc.

For example, the storage device 85 is an HDD or an SSD. In addition, the storage device 85 may be a nonvolatile memory such as a flash memory in which stored information is retained even when power is turned off. The storage device 85 stores a control program Pc, a member information Md, and an electronic receipt information Eb.

The control program Pc is a program for controlling the entire operation of the mobile terminal 80.

The member information Md is, for example, a member code necessary for using the electronic receipt system.

The electronic receipt information Eb is electronic receipt information indicating a payment result when the user of the mobile terminal 80 purchases a commodity. The electronic receipt information Eb is transmitted from the server 20 to the mobile terminal 80 and stored therein.

The display device 91 displays a screen generated by an instruction of the processor 81. The display device 91 is a device such as an LCD or an organic EL.

The operation device 92 accepts an input operation of the operator and issues a signal indicating the input operation and detectable by the processor 81. The operation device 92 is constituted by devices such as a touch panel and a keyboard.

The camera 93 is incorporated in the mobile terminal 80, and captures, for example, an image of the code symbol Q attached to the weighing device 40.

The communication interface 94 is an interface for communicating with the server 20 via wireless communication such as a wireless LAN.

Figure 5:
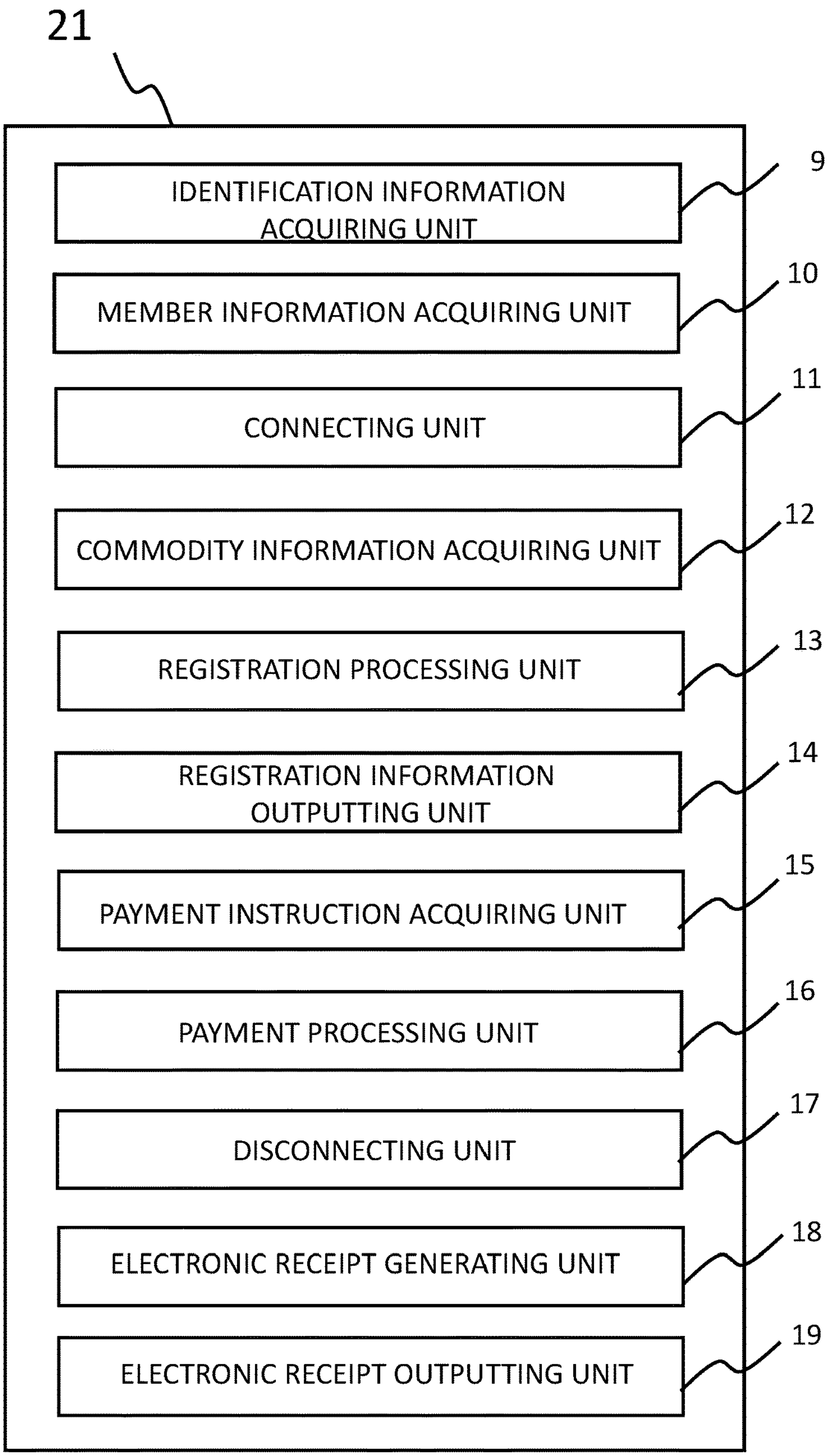
FIG. 5 is a functional block diagram showing a functional configuration of a server according to a first embodiment.

A functional configuration of the server 20 will be described with reference to FIG. 5. FIG. 5 is a functional block diagram showing a functional configuration of the server 20.

The processor 21 of the server 20 loads the control program Pa onto the RAM 23 and executes the control program Pa to operate as an identification information acquiring unit 9, a member information acquiring unit 10, a connecting unit 11, a commodity-information acquiring unit 12, a registration processing unit 13, a registration information outputting unit 14, a payment instruction acquiring unit 15, a payment processing unit 16, a disconnecting unit 17, an electronic receipt generating unit 18, and an electronic-receipt outputting unit 19 illustrated in FIG. 5.

The identification information acquiring unit 9 acquires identification information for uniquely specifying a weighing device 40 for weighing a commodity sold by weight from a mobile terminal 80.

The member information acquiring unit 10 acquires a member code of a user necessary for using the electronic receipt system from the mobile terminal 80.

The connecting unit 11 establishes communication with the weighing device 40 having the identification information acquired by the identification information acquiring unit 9.

The commodity information acquiring unit 12 acquires commodity information for specifying a commodity to be sold by weight and the weight of the commodity from the weighing device 40 with which communication is established.

The registration processing unit 13 performs registration processing for registering the information acquired by the commodity information acquiring unit 12.

The registration information outputting unit 14 outputs commodity registration information about the commodity on which the registration processing unit 13 has performed the registration processing to the mobile terminal 80 of the customer.

The payment instruction acquiring unit 15 acquires an instruction to perform payment processing from the mobile terminal 80 of the customer.

The payment processing unit 16 performs payment processing on the result of the registration processing performed by the registration processing unit 13.

The disconnecting unit 17 disconnects the communication with the weighing device 40.

The electronic receipt generating unit 18 generates an electronic receipt indicating the content of the payment performed by the payment processing unit 16.

The electronic receipt outputting unit 19 outputs the electronic receipt generated by the electronic receipt generating unit 18 to the mobile terminal 80 associated with the customer who has purchased the commodity.

Figure 6:
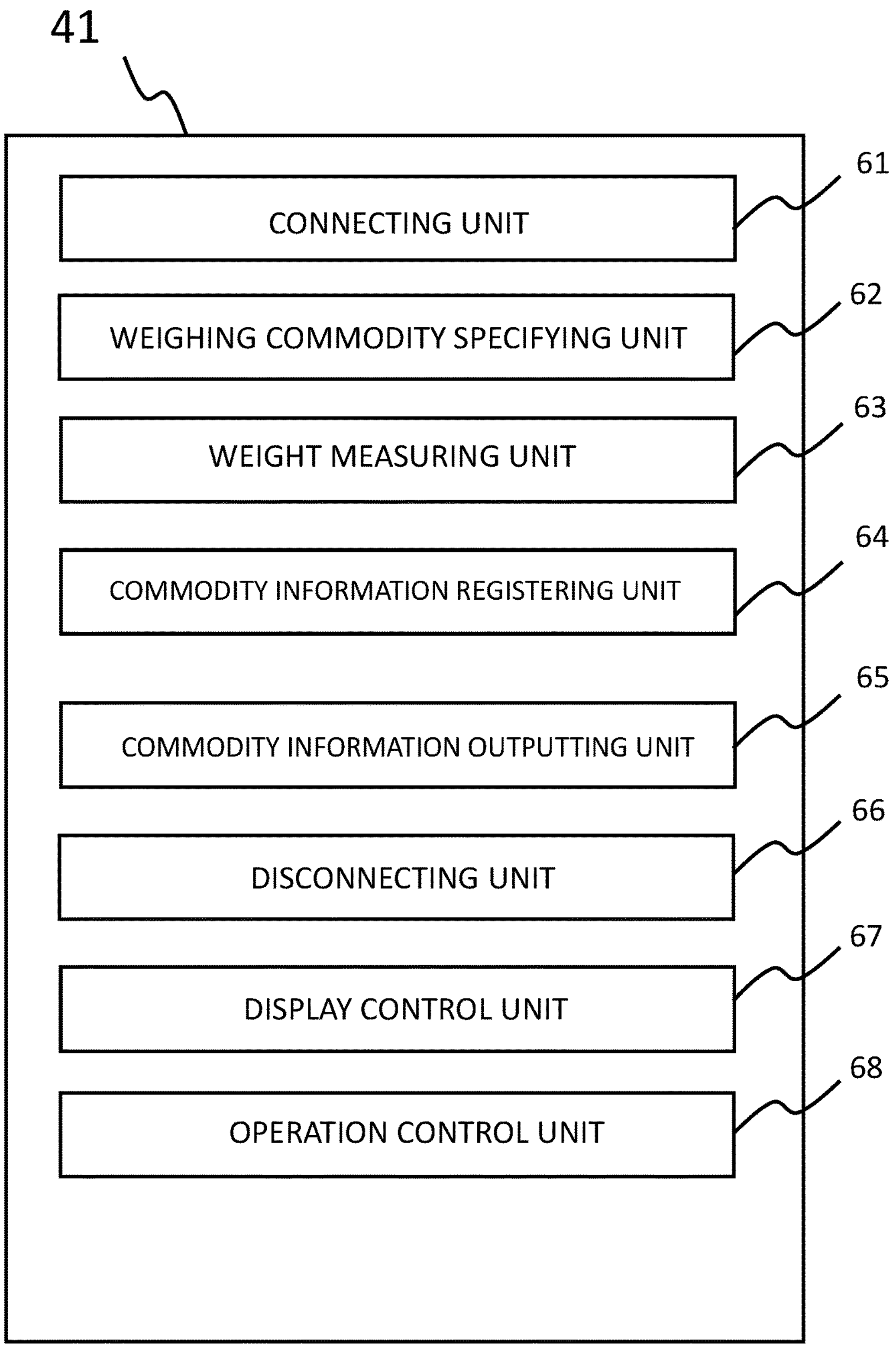
FIG. 6 is a functional block diagram showing a functional configuration of a weighing device according to a first embodiment.

A functional configuration of the weighing device 40 will be described with reference to FIG. 6. FIG. 6 is a functional block diagram showing a functional configuration of the weighing device 40.

The processor 41 of the weighing device 40 loads the control program Pb onto the ROM 43 and executes the control program Pb to operate as a connecting unit 61, a weighing commodity specifying unit 62, a weight measuring unit 63, a commodity information registering unit 64, a commodity information outputting unit 65, a disconnecting unit 66, a display control unit 67, and an operation control unit 68 shown in FIG. 6.

The connecting unit 61 receives a connection request from the server 20, and establishes communication with the server 20.

The weighing commodity specifying unit 62 uniquely specifies a weighed commodity to be purchased by a customer. Specifically, the commodity to be purchased by the customer is specified by reading an identification code such as a bar code with the scanner 54.

The weight measuring unit 63 controls the weight sensor 55 to weigh a commodity to be purchased by a customer.

The commodity information registering unit 64 generates a commodity registration file Mc in which commodity information of a weighed commodity purchased by a customer, the weight thereof, a purchase price, and information for uniquely specifying the weighing device 40 performing weighing are registered.

The commodity information outputting unit 65 controls the communication interface 56 to output the contents of the commodity registration file Mc to the connected server 20.

The disconnecting unit 66 disconnects communication with the server 20.

The display control unit 67 generates a display screen to be displayed on the store clerk-side display device 51 or the customer-side display device 52 of the weighing device 40. In addition, the display control unit 67 outputs the generated display screen to the store clerk-side display device 51 or the customer-side display device 52.

The operation control unit 68 acquires operation information about an operation performed on the operation device 53 of the weighing device 40. The processor 41 controls the weighing device 40 in accordance with the acquired operation information.

Figure 7:
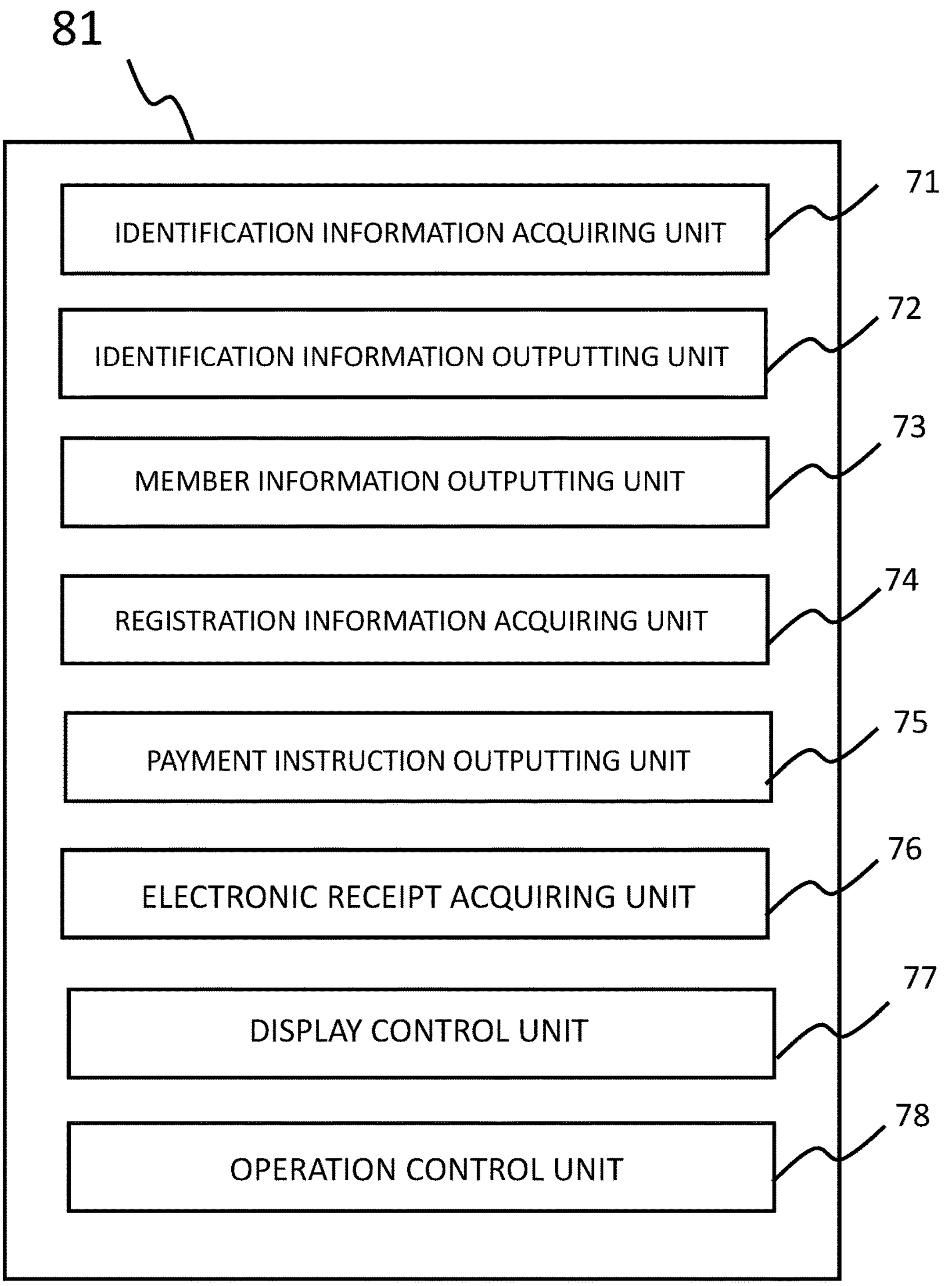
FIG. 7 is a functional block diagram showing a functional configuration of a mobile terminal according to a first embodiment.

A functional configuration of the mobile terminal 80 will be described with reference to FIG. 7. FIG. 7 is a functional block diagram showing the functional configuration of the mobile terminal 80.

The processor 81 of the mobile terminal 80 loads the control program Pc onto the RAM 83 and executes the control program Pc to operate as an identification information acquiring unit 71, an identification information outputting unit 72, a member information outputting unit 73, a registration information acquiring unit 74, a payment instruction outputting unit 75, an electronic receipt acquiring unit 76, a display control unit 77, and an operation control unit 78 illustrated in FIG. 7.

The identification information acquiring unit 71 acquires identification information for uniquely specifying the weighing device 40 from the weighing device 40. Specifically, the identification information acquiring unit 71 acquires an image of the code symbol Q (see FIG. 1) attached to the weighing device 40 and captured by the camera 93 (see FIG. 4) of the mobile terminal 80, and acquires identification information for uniquely specifying the weighing device 40 from the captured code symbol Q.

The identification information outputting unit 72 outputs, to the server 20, the identification information acquired by the identification information acquiring unit 71 and uniquely specifying the weighing device 40.

The member information outputting unit 73 outputs a member code of a user required to use an electronic receipt system.

The registration information acquiring unit 74 acquires commodity registration information from the server 20.

The payment instruction outputting unit 75 outputs an instruction to perform a payment process to the server 20.

The electronic receipt acquiring unit 76 acquires an electronic receipt indicating a result of the payment process from the server 20.

The display control unit 77 generates a display screen to be displayed on the display device 91 of the mobile terminal 80. Further, the display control unit 77 outputs the generated display screen to the display device 91.

The operation control unit 78 acquires operation information about an operation performed on the operation device 92 of the mobile terminal 80. The processor 81 controls the mobile terminal 80 according to the acquired operation information.

The configuration of the commodity registration file Mc generated by the weighing device 40 will be described with reference to FIG. 8. FIG. 8 is a diagram showing a configuration of the commodity registration file Mc.

The commodity registration file Mc includes a weighing device code 34, a commodity code 35, a commodity name 36, a unit price 37 (e.g., US dollar), a weight 38 (e.g., pound or gram), and a price 39.

The weighing device code 34 is identification information for uniquely specifying the weighing device 40. The weighing device code 34 may include, for example, a serial number of the weighing device 40. The weighing device code 34 also includes, for example, information that uniquely identifies the store in which the weighing device 40 is installed. The weighing deice code 34 is stored in the memory 45 of the weighing device 40 as weighing device identification information Ib (see FIG. 3).

The commodity code 35 is identification information for uniquely specifying a commodity sold by weight and weighed by the weighing device 40.

The item name 36 is the name of the item corresponding to the item code 35.

The unit price 37 is the price per unit weight of the commodity corresponding to the commodity code 35.

The weight 38 is the weight of the commodity corresponding to the commodity code 35 measured by the weighing device 40.

The price 39 is a value obtained by multiplying the unit price 37 by the weight 38.

Figure 9:
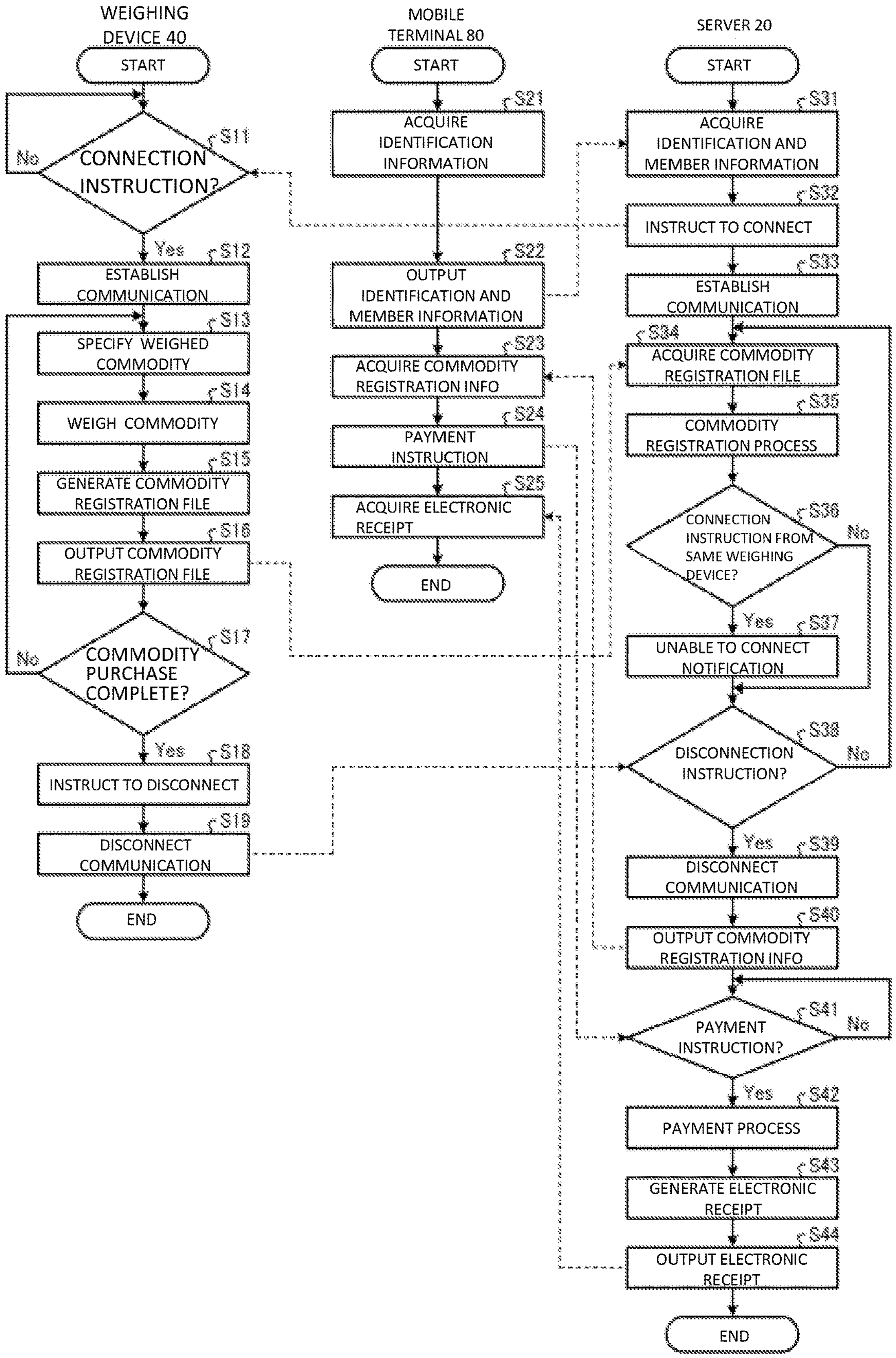
FIG. 9 is a flowchart showing a flow of processing performed by a POS system according to a first embodiment.

A flow of processing performed by the POS system 1 will be described with reference to FIG. 9. FIG. 9 is a flowchart showing a flow of processing performed by the POS system 1.

A flow of processing performed by the weighing device 40 will be described.

The processor 41 determines whether there is a connection instruction from the server 20 via the connecting unit 61 (step S11). When it is determined that there is a connection instruction from the server 20 (step S11:Yes), the processor 41 proceeds to step S12. On the other hand, when it is determined that there is no connection instruction from the server 20 (step S11:No), the process returns to step S11, and the processor 41 repeats step S11 until it determines Yes.

When the processor 41 determines in step S11 that there is a connection instruction from the server 20, the connecting unit 61 establishes communication with the server 20 (step S12).

The weighing commodity specifying unit 62 specifies a weighed commodity (step S13).

The weight measuring unit 63 controls the weight sensor 55 to weigh the commodity (step S14).

The commodity information registering unit 64 generates a commodity registration file Mc (step S15).

The commodity information outputting unit 65 controls the communication interface 56 to output the commodity registration file Mc to the server 20 (step S16).

The operation control unit 68 determines whether the purchase of the weighing commodity has been completed by confirming whether information indicating completion of commodity registration has been input by the store clerk (step S17). When it is determined that the purchase of the weighing commodity is completed (step S17:Yes), the processor 41 proceeds to step S18. On the other hand, when the operation control unit 68 does not determine that the purchase of the weighing commodity is completed (step S17:No), the process returns to step S13, and the processor 41 repeats the registration of the next weighed commodity.

When it is determined in step S17 that the purchase of the weighing commodity is completed, the disconnecting unit 66 instructs the server 20 to disconnect the communication (step S18).

The disconnecting unit 66 disconnects the communication with server 20 (step S19). Thereafter, the weighing device 40 ends the process of FIG. 9.

A flow of processing performed by the mobile terminal 80 will be described.

The identification information acquiring unit 71 acquires the identification information of the weighing device 40 by decoding the code symbol Q of the weighing device 40 captured by the camera 93 (step S21).

The identification information outputting unit 72 controls the communication interface 94 to output the identification information of the weighing device 40 acquired by the identification information acquiring unit 71 to the server 20. Further, the member information outputting unit 73 controls the communication interface 94 to output the member information Md to the server 20 (step S22).

The registration information acquiring unit 74 acquires the commodity registration information from the server 20 (step S23).

The payment instruction outputting unit 75 controls the communication interface 94 to output an execution instruction of the payment process to server 20 (step S24).

The electronic receipt acquiring unit 76 acquires an electronic receipt from the server 20 (step S25). Thereafter, the mobile terminal 80 ends the process of FIG. 9. Although not shown in the flowchart of FIG. 9, the display control unit 77 of the mobile terminal 80 controls the display device 91 to display the acquired electronic receipt when receiving an instruction from the user.

A flow of processing performed by the server 20 will be described.

The identification information acquiring unit 9 acquires the identification information of the weighing device 40 from the mobile terminal 80. Further, the member information acquiring unit 10 acquires the member information Md from the mobile terminals 80 (step S31).

The connecting unit 11 instructs the weighing device 40 corresponding to the identification information acquired in step S31 to establish communication (step S32).

The connecting unit 11 establishes communication with the weighing device 40 via the communication interface 33 (step S33).

The commodity information acquiring unit 12 acquires the commodity registration file Mc from the weighing device 40 (step S34).

The registration processing unit 13 performs the commodity registration processing based on the contents registered in the commodity registration file Mc (step S35).

The connecting unit 11 determines whether there is an instruction to connect to the currently connected weighing device 40 (step S36). When the processor 21 determines that there is an instruction to connect to the currently connected weighing device 40 (step S36:Yes), the process proceeds to step S37. On the other hand, if the connecting unit 11 does not determine that there is an instruction to connect to the currently connected weighing device 40 (step S36:No), the process proceeds to step S38.

When it is determined in step S36 that there is an instruction to connect to the currently connected weighing device 40, the connecting unit 11 notifies the mobile device 80, which has issued the connection instruction in step S36, that connection is not possible (step S37).

Following step S37 or when it is not determined in step S36 that there is an instruction to connect to the currently connected weighing device 40, the disconnecting unit 17 determines whether there is an instruction to disconnect the communication from the weighing device 40 (step S38). When the disconnecting unit 17 determines that there is a communication disconnection instruction from the weighing device 40 (step S38:Yes), the process proceeds to step S39. On the other hand, when the disconnecting unit 17 determines that there is no communication disconnection instruction from the weighing device 40 (step S38:No), the process returns to step S34.

When it is determined in step S38 that there is an instruction to disconnect the communication from the weighing device 40, the disconnecting unit 17 disconnects the communication with the weighing device 40 (step S39).

The registration information outputting unit 14 controls the communication interface 33 to output the commodity registration information to the mobile device 80 of the customer (step S40).

The payment instruction acquiring unit 15 determines whether a payment instruction has been acquired from the mobile device 80 of the customer (step S41). When it is determined that the payment instruction has been acquired from the mobile terminal 80 (step S41:Yes), the process proceeds to step S42. On the other hand, if the payment instruction acquiring unit 15 does not determine that the payment instruction is acquired from the mobile device 80 (step S41:No), the process repeats step S41.

When it is determined in step S41 that the payment instruction has been acquired from the mobile device 80, the payment processing unit 16 payment processing on the result of the registration processing performed in step S35 (step S42).

The electronic receipt generating unit 18 generates an electronic receipt indicating a result of the payment processing (step S43).

The electronic receipt outputting unit 19 controls the communication interface 33 to output the generated electronic receipt to the mobile terminal 80 of the customer (step S44). Thereafter, the server 20 ends the process of FIG. 9.

As described above, the server 20 according to the first embodiment includes the connecting unit 11 that establishes communication with the weighing device 40 that weighs a commodity sold by weight, the commodity information acquiring unit 12 that acquires commodity information specifying the commodity and the weight of the commodity from the weighing device 40, the registration processing unit 13 that registers the information acquired by the commodity information acquiring unit 12, and the disconnecting unit 17 that disconnects communication with the weighing device 40. Therefore, even when a customer purchases a plurality of commodities to be weighed in succession, it is sufficient to establish communication between the weighing device 40 and the server 20 once. In other words, it is not necessary to establish communication between the weighing device 40 and the server 20 for each transaction.

In addition, the server 20 according to the first embodiment further includes the identification information acquiring unit 9 and the connecting unit 11. The identification information acquiring unit 9 acquires identification information that uniquely specifies the weighing device 40. The connecting unit 11 establishes communication with the weighing device 40 specified by the identification information acquired from the mobile terminal 80 by the identification information acquiring unit 9. Therefore, the server 20 can acquire the identification information of the weighing device 40 via the mobile terminal 80 of the customer. Accordingly, the POS system 1 can operate as a so-called smartphone POS system that performs payment of a transaction by performing communication between the mobile terminal 80 and a transaction management server.

In addition, in the server 20 of the first embodiment, in a case where communication is established between the server 20 and the weighing device 40, when a communication connection request is received from another mobile terminal 80, the server 20 transmits information indicating that communication is not possible to the other mobile terminal 80. Therefore, in a state where the server 20 and the weighing device 40 are already connected, even if another customer transmits the identification information of the weighing device 40 acquired by his/her own mobile terminal 80 to the server 20, the connected communication is not affected. In addition, it is possible to notify another customer that communication is not possible because communication is already connected.

In addition, the server 20 of the first embodiment receives an instruction from the weighing device 40 and disconnects the communication with the weighing device 40. Therefore, when the purchase of the commodity to be weighed is finished, the customer can disconnect the communication between the weighing device 40 and the server 20 without performing a special operation.

Second Embodiment

Next, a POS system 2 in a second embodiment will be described with reference to the drawings.

Figure 10:
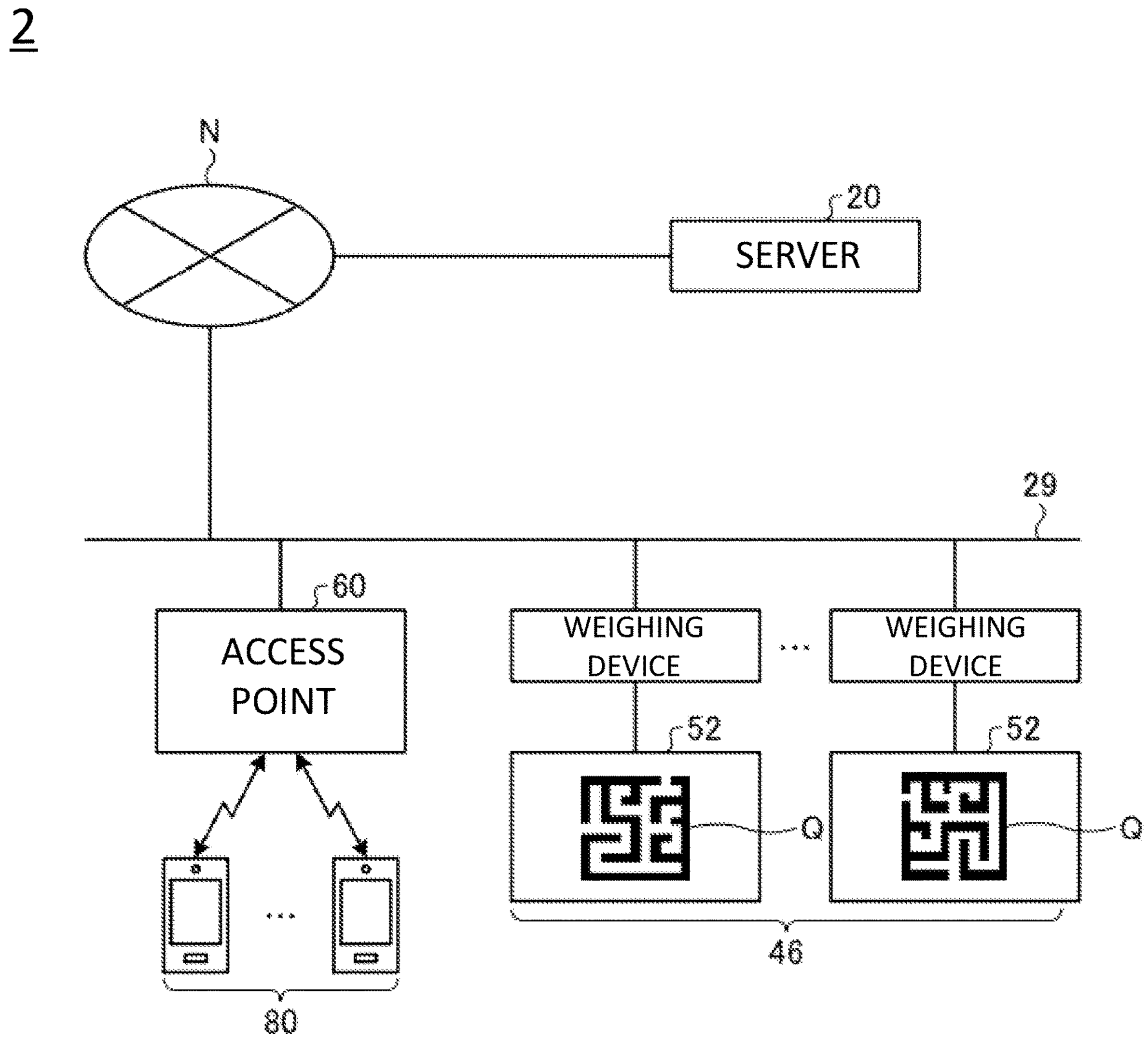
FIG. 10 is a system block diagram showing a system configuration of a POS system according to a second embodiment.

The system configuration of the POS system 2 will be described with reference to FIG. 10. FIG. 10 is a system block diagram showing a system configuration of the POS system 2.

The POS system 2 is a system that performs commodity registration processing and payment processing for weighed commodities such as meat whose price varies according to their weight. The POS system 2 includes a server 20, one or more weighing device 46*s*, and one or more mobile terminals 80.

The server 20 and the mobile terminal 80 have the same hardware configuration and functional configuration as the server 20 and the mobile terminal 80 included in the POS system 1 described in the first embodiment, respectively. In the following description, the hardware components and functional components of the server 20 and the mobile terminal 80 will be described using the same names and reference numerals as those used in the description of the first embodiment.

The weighing device 46 further includes a function of outputting a code symbol Q (hereinafter referred to as "code information") including identification information for uniquely specifying the weighing device 46, in addition to the weighing device 40 described in the first embodiment. The output code symbol Q is displayed on the customer-side display device 52 connected to the weighing device 46. Since the weighing device 46 has the same hardware configuration as the weighing device 40, in the following description, the hardware components of the weighing device 46 will be described using the same names and reference numerals as those of the hardware components of the weighing device 40.

The server 20 communicates with the weighing device 46 via the in-store network 29 and the network N.

The mobile terminal 80 communicates with the server 20 via an access point 60 provided in the store, the in-store network 29, and the network N.

Figure 11:
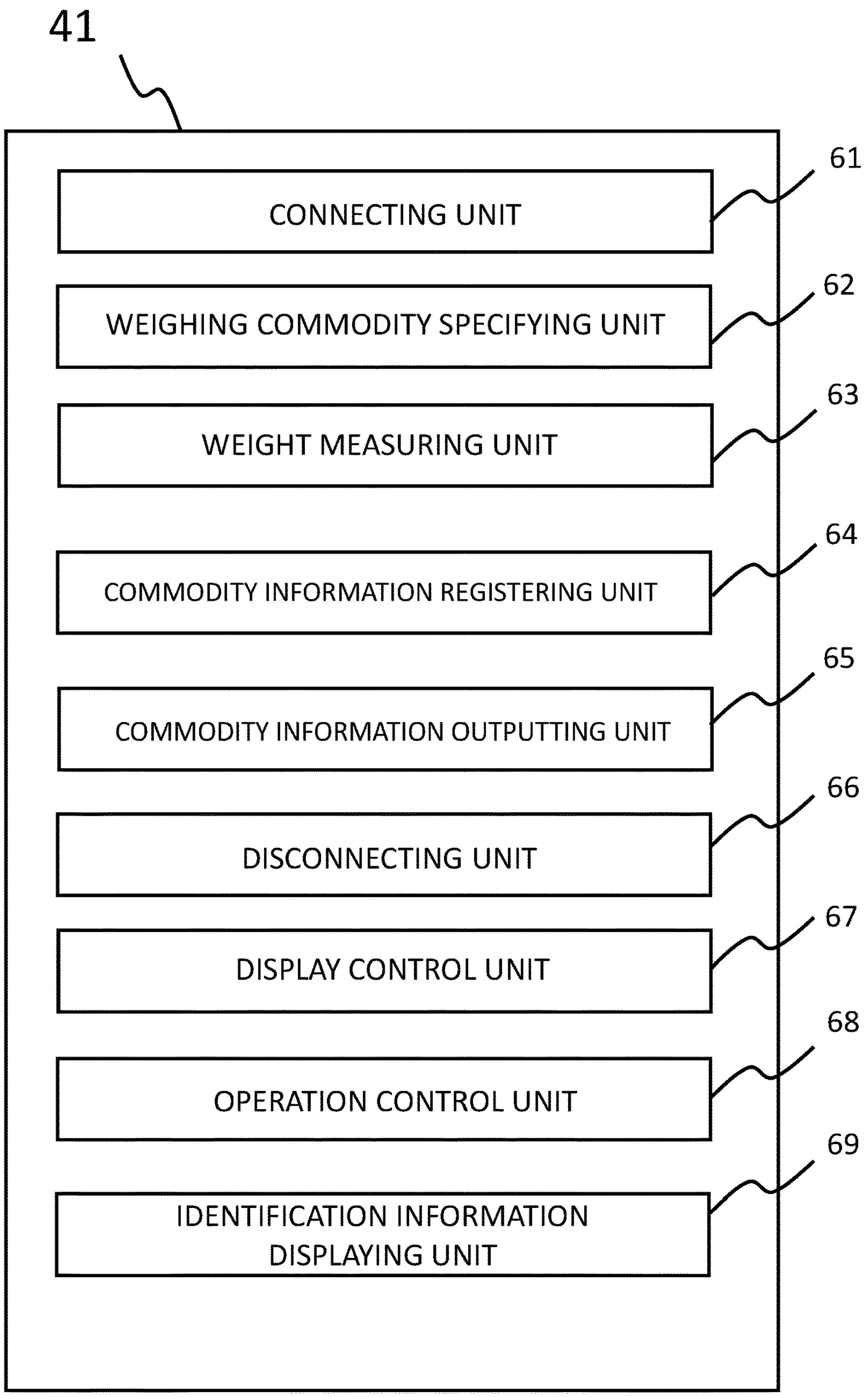
FIG. 11 is a functional block diagram showing a functional configuration of a weighing device according to a second embodiment.

A functional configuration of the weighing device 46 will be described with reference to FIG. 11. FIG. 11 is a functional block diagram showing a functional configuration of the weighing device 46.

The processor 41 of the weighing device 46 loads the control program Pb onto the ROM 43 and execute the control program Pb to operate as a connecting unit 61, a weighing commodity specifying unit 62, a weight measuring unit 63, a commodity information registering unit 64, a commodity information outputting unit 65, a disconnecting unit 66, a display control unit 67, an operation control unit 68, and an identification information displaying unit 69 shown in FIG. 11.

The functions of the connecting unit 61, the weighing commodity identification unit 62, the weight measuring unit 63, the commodity information registering unit 64, the commodity information outputting unit 65, the disconnecting unit 66, the display control 67, and the operation control unit 68 are as described in the first embodiment.

The identification information displaying unit 69 generates screen information indicating a code symbol Q including identification information for uniquely specifying a weighing device 46. Further, the identification information displaying unit 69 causes the display control unit 67 to control the customer-side display device 52 to display the generated screen information (see FIG. 3). In addition, the identification information displaying unit 69 acquires an instruction to delete the screen information indicating the code symbol Q, and causes the display control unit 67 to control the customer-side display device 52 to delete the screen information.

Figure 12:
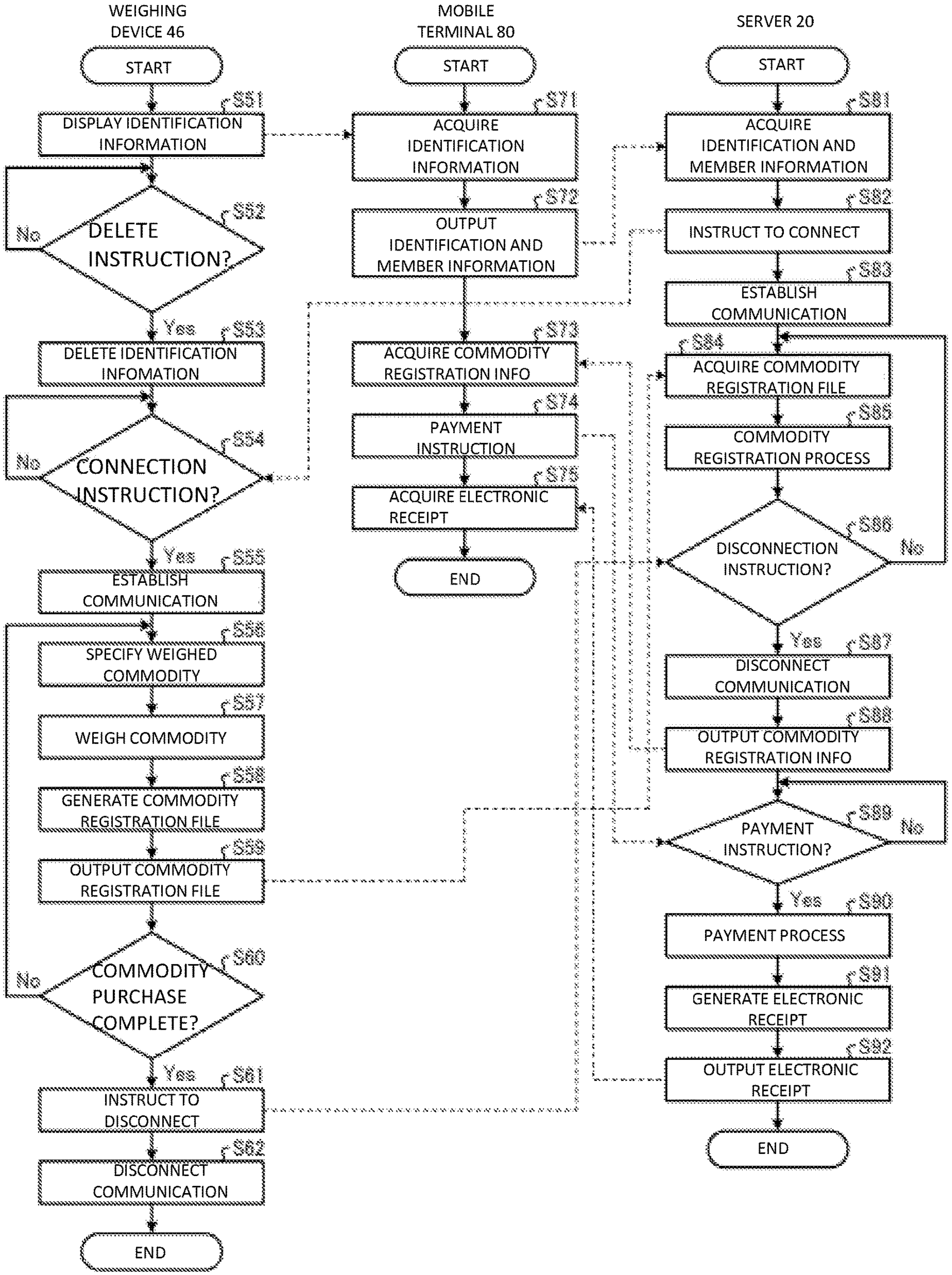
FIG. 12 is a flowchart showing a flow of processing performed by a POS system according to a second embodiment.

A flow of processing performed by the POS system 2 will be described with reference to FIG. 12. FIG. 12 is a flowchart showing a flow of processing performed by the POS system 2.

The identification information display 69 generates screen information indicating a code symbol Q including identification information that uniquely identifies the weighing device 46, and causes the display control unit 67 to control the customer-side display device 52 to display the generated screen information (see FIG. 3) (step S51).

The identification information displaying unit 69 determines whether an instruction to delete the code symbol Q has been given by the store clerk (step S52). When the identification information displaying unit 69 determines that an instruction to delete the code symbol Q has been given by the store clerk (step S52:Yes), the process proceeds to step S53. On the other hand, if the identification information displaying unit 69 does not determine that an instruction to delete the code symbol Q has been given by the store clerk (step S52:No), the process returns to step S52, and the identification information displaying unit 69 repeatedly executes step S52 until determining YES. When the store clerk confirms that the customer has photographed the code symbol Q displayed on the customer-side display device 52 with the camera 93 of the mobile terminal 80, the store clerk operates the operation device 53 to instruct the weighing device 46 to delete the code symbol Q.

When the identification information displaying unit 69 determines in step S52 that the store clerk instructed deletion of the code symbol Q, the identification information displaying unit 69 causes the display control unit 67 to control the customer-side display device 52 to delete the code symbol Q.

Hereinafter, since the flow of the processing performed from step S54 to step S62 is the same as the flow of the processing performed by the weighing device 40 described in the first embodiment (i.e., the flow of the processing performed from step S11 to step S19 in FIG. 9), the description thereof will be omitted.

Since the flow of the processing performed by the mobile device 80 is the same as the flow of the processing performed by the mobile device 80 described in the first embodiment (i.e., the flow of the processing performed from step S21 to step S25 in FIG. 9), description thereof will be omitted.

Since the flow of the process performed by the server 20 is substantially the same as the flow of the process performed by the server 20 described in the first embodiment, the description thereof will be omitted.

The difference from the processing performed by the server 20 of the first embodiment is that the processing corresponding to steps S36 and S37 in FIG. 9 is not necessary. That is, in the POS system 2 of the second embodiment, the code symbol Q including the identification information for uniquely specifying the weighing device 46 is displayed on the customer-side display device 52 in response to an instruction by the identification information displaying unit 69 of the weighing device 46. After the customer photographs the code symbol Q with the mobile terminal 80, the displayed code symbol Q is erased.

Since two or more mobile terminals 80 do not read the code symbol Q at the same time, a request for connection between the weighing device 46 and the server 20 is not made by customers other than the customer who is performing a transaction with the weighing device 46. Therefore, the server 20 of the present embodiment does not need to perform processing corresponding to steps S36 and S37 in FIG. 9.

As described above, in the server 20 of the second embodiment, the weighing device 46 connected to the server 20 includes the identification information displaying unit 69. The identification information displaying unit 69 controls the customer-side display device 52 to display the code symbol Q (i.e., the code information) including identification information that uniquely specifying the weighing device 46 to a customer who is purchasing a commodity sold by weight in response to a display instruction, and deletes the code symbol Q in response to a deletion instruction. Therefore, since the code information necessary for connecting the server 20 and the weighing device 46 is displayed only while the customer reads the code symbol Q, it is possible to prevent other customers from requesting the server 20 to connect to the same weighing device 46.

Third Embodiment

A POS system 3 according to a third embodiment will be described with reference to the drawings.

Figure 13:
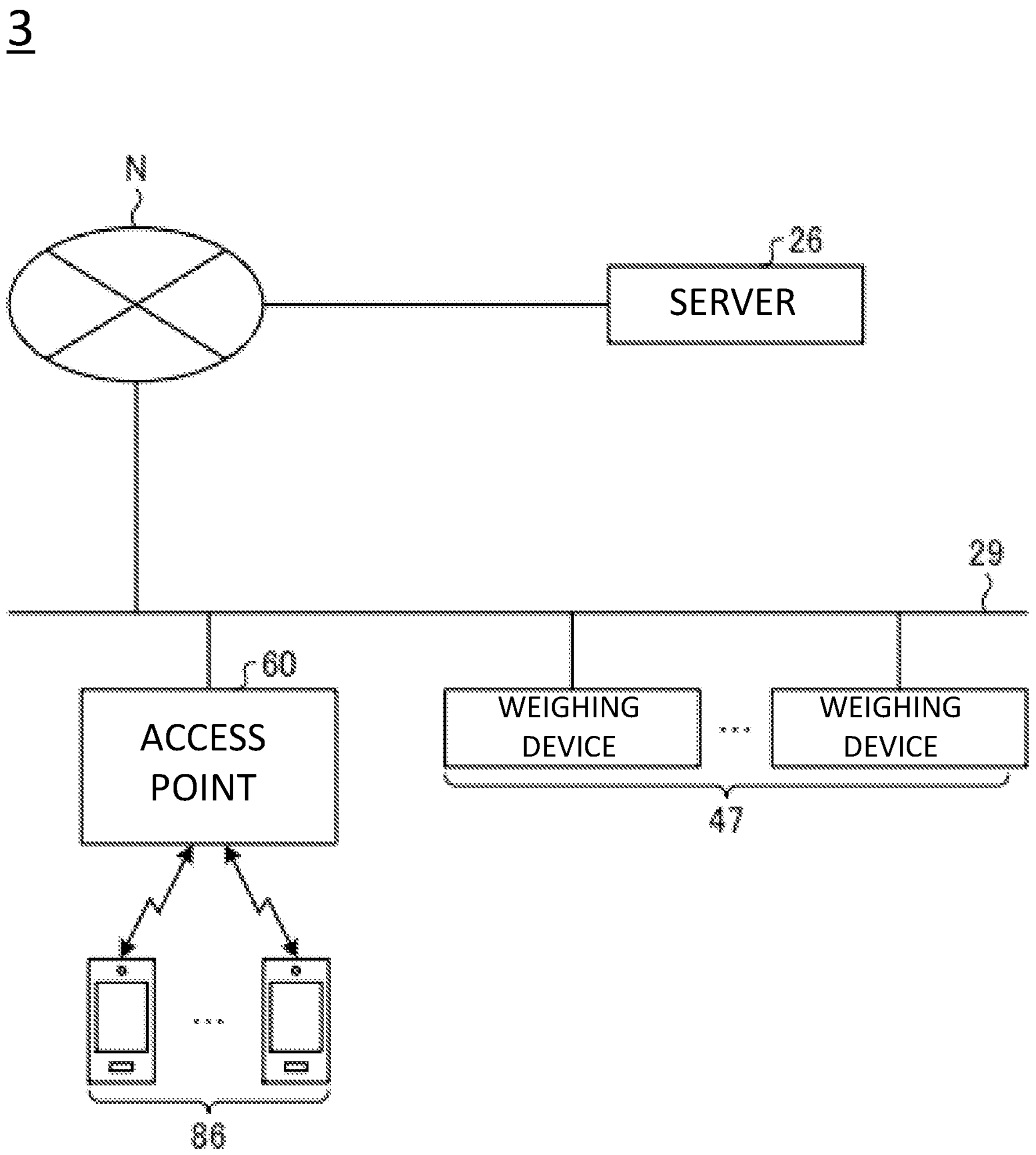
FIG. 13 is a system block diagram showing a system configuration of a POS system according to a third embodiment.

A system configuration of the POS system 3 will be described with reference to FIG. 13. FIG. 13 is a system block diagram showing the system configuration of the POS system 3.

The POS system 3 is a system that performs a commodity registration process and a payment process when a weighed commodity such as meat whose price varies depending on the weight to be purchased is sold. The POS system 3 includes a server 26, one or more weighing devices 47, and one or more mobile terminals 86.

The server 26, the weighing device 47, and the mobile terminal 86 have the same hardware configuration as the server 20, the weighing device 40, and the mobile terminal 80 included in the POS system 1 described in the first embodiment, respectively. In the following description, the hardware components of the server 26, the weighing device 47, and the mobile terminal 86 will be described using the same names and reference numerals as those used in the description of the first embodiment.

The server 26 acquires information for declaring the purchase of a commodity to be weighed and the current location of the mobile terminal 86 from the mobile terminal 86 of a customer. In addition, the server 26 searches for the weighing device 47 that is present near the current location of the mobile terminal 86 and is currently in a state of being able to perform weighing and establishes communication with the searched weighing device 47. Further, the server 26 outputs information indicating the location of the weighing device 47 with which the communication is established to the mobile terminal 86. Further, the server 26 acquires commodity information for specifying the commodity to be weighed and the weight of the commodity from the weighing device 47. Further, the server 26 registers the commodity information acquired from the weighing device 47 and the weight of the commodity. Further, the server 26 outputs the registration result of the commodity to the mobile terminal 86 associated with the customer who is purchasing the commodity. Further, the server 26 disconnects the communication with the weighing device 47.

Further, the server 26 performs a payment process based on the registered commodity information of the weighed commodity and the weight thereof, and generates an electronic receipt including a payment result. In addition, the server 26 outputs the generated electronic receipt to the mobile terminal 86 associated with the customer who has purchased the weighed commodity. In the present embodiment, the server 26 is described as having all of the functions described above, but some of the functions described above may be assigned to another server device.

The weighing device 47 specifies a weighed commodity, measures the weight thereof, and calculates its purchase price. Further, the weighing device 47 receives a connection instruction or a disconnection instruction from the server 26 and establishes or disconnects communication with the server 26. Further, the weighing device 47 outputs information for uniquely specifying the commodity to be weighed and the weight to be purchased to the server 26.

The mobile terminal 86 is carried by a customer, and outputs information indicating that the commodity to be weighed is purchased and the current location of the mobile terminal 86 to the server 26 in response to an operation by the customer. Further, the mobile terminal 86 acquires registered commodity information from the server 26. Further, the mobile terminal 86 outputs information for instructing execution of the payment processing to the server 26. Further, the mobile terminal 86 acquires an electronic receipt indicating a result of the payment from the server 26.

The server 26 communicates with the weighing device 47 via the in-store network 29 and the network N.

The mobile terminal 86 communicates with the server 26 via an access point 60 provided in the store, the in-store network 29, and the network N.

Figure 14:
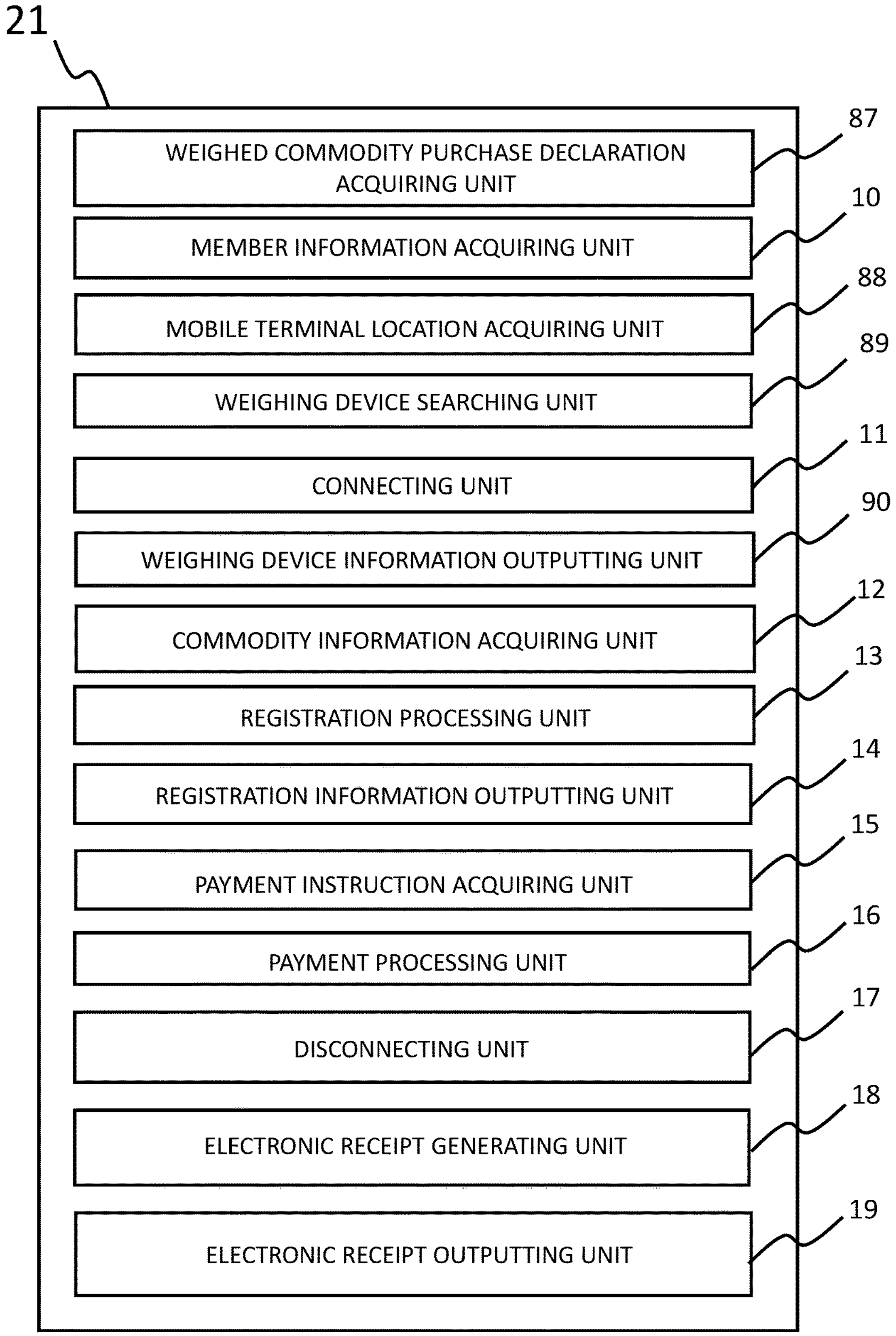
FIG. 14 is a functional block diagram showing a functional configuration of a server according to a third embodiment.

A functional configuration of the server 26 will be described with reference to FIG. 14. FIG. 14 is a functional block diagram showing a functional configuration of the server 26.

The processor 21 of the server 26 loads the control program Pa onto the RAM 23 and execute the control program Pa to operate as a weighed commodity purchase declaration acquiring unit 87, a member information acquiring unit 10, a mobile terminal location acquiring unit 88, a weighing device searching unit 89, a connecting unit 11, a weighing device information outputting unit 90, a commodity information acquiring unit 12, a registration processing unit 13, a registration information outputting unit 14, a payment instruction acquiring unit 15, a payment processing unit 16, a disconnecting unit 17, an electronic receipt generating unit 18, and an electronic receipt outputting unit 19 shown in FIG. 14.

Among these units, the member information acquiring unit 10, the connecting unit 11, the commodity information acquiring unit 12, the registration processing unit 13, the registration information outputting unit 14, the payment instruction acquiring unit 15, the payment processing unit 16, the disconnecting unit 17, the electronic receipt generating unit 18, and the electronic receipt outputting unit 19 are the same as those described in the first embodiment, and thus a description thereof will not be repeated.

The weighed commodity purchase declaration acquiring unit 87 acquires information for declaring the purchase of a weighed commodity from a mobile terminal 86.

The mobile terminal location acquiring unit 88 acquires information for declaring the purchase of a commodity to be weighed and acquires the current location of a mobile terminal 86 from the mobile terminal 86.

When information for declaring the purchase of a commodity to be weighed is acquired, the weighing device searching unit 89 searches for the weighing device 47 which is near the current location of the mobile terminal 86 and is in a state capable of weighing.

The weighing device information outputting unit 90 outputs information indicating the location of the weighing device 47 with which communication has been established to the mobile terminal 86. The information indicating the location of the weighing device 47 is output, for example, in the form of map information indicating the location of the weighing device 47 in the store (e.g., coordinates).

Figure 15:
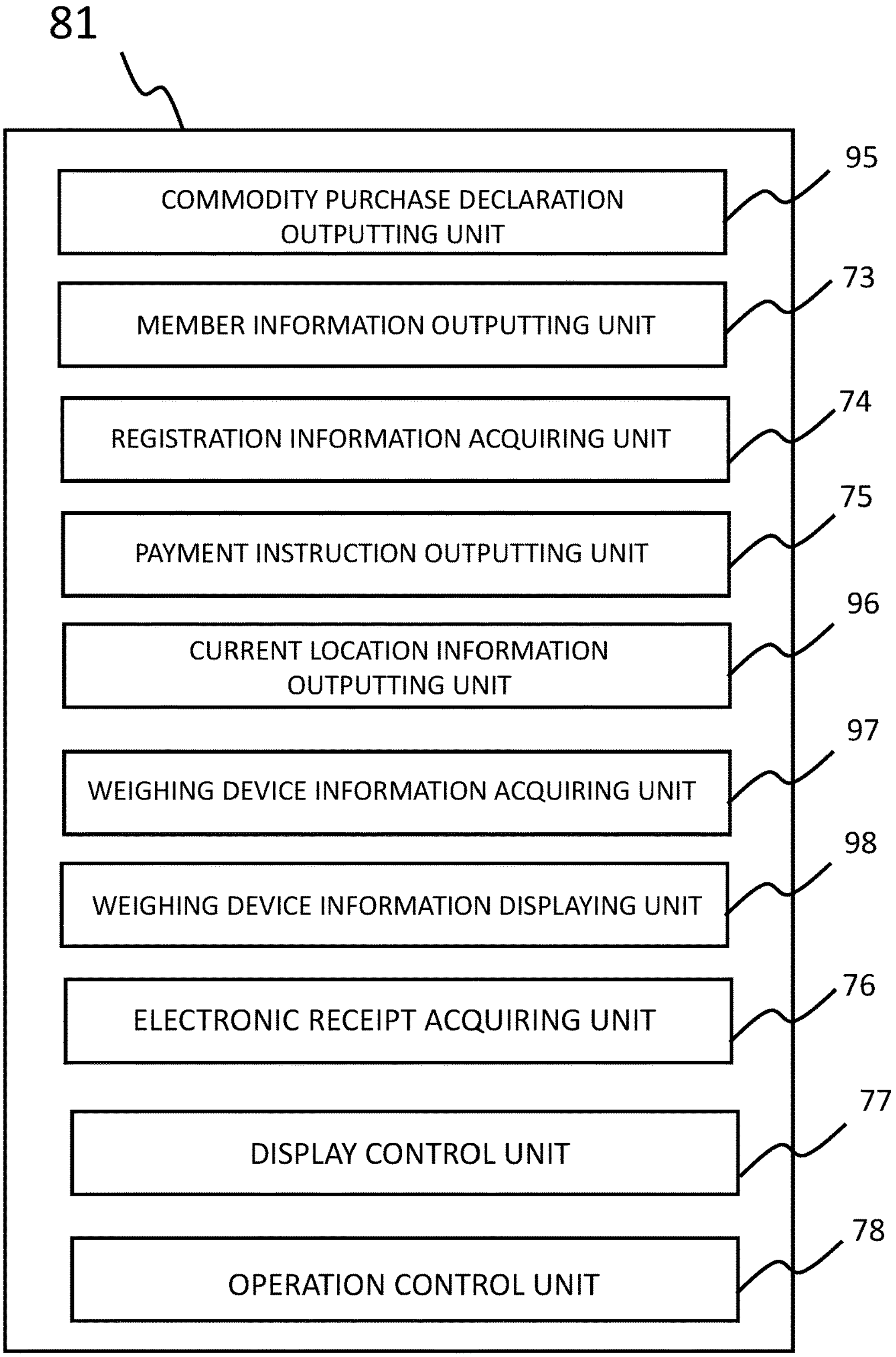
FIG. 15 is a functional block diagram showing a functional configuration of a mobile terminal according to a third embodiment.

The functional configuration of the mobile terminal 86 will be described with reference to FIG. 15. FIG. 15 is a functional block diagram showing a functional configuration of the mobile terminal 86.

The processor 81 of the mobile terminal 86 loads the control program Pc onto the RAM 83 and executes the control program Pc to operate as a weighing commodity purchase declaration outputting unit 95, a member information outputting unit 73, a registration information acquiring unit 74, a payment instruction outputting unit 75, a current location information outputting unit 96, a weighing device information acquiring unit 97, a weighing device information displaying unit 98, an electronic receipt acquiring unit 76, a display control unit 77, and an operation control unit 78 illustrated in FIG. 15.

Among these, the member information outputting unit 73, the registration information acquiring unit 74, the payment instruction outputting unit 75, the electronic receipt acquiring unit 76, the display control unit 77, and the operation control unit 78 are the same as those described in the first embodiment, and thus a repeated description thereof will be omitted.

The weighing commodity purchase declaration outputting unit 95 detects a declaration made by a customer for declaring the purchase of a weighed commodity. Further, the weighing commodity purchase declaration outputting unit 95 outputs information indicating that the purchase of the weighed commodity is declared to the server 26.

The current location information outputting unit 96 controls the communication interface 94 to output the current location of the mobile terminal 86 to the server 26. Note that the mobile terminal 86 includes a GPS receiver (not shown in FIG. 4), and the mobile terminal 86 specifies its own current location by analyzing a GPS signal received by the GPS receiver. The mobile terminal 86 can detect its location using any other known techniques (e.g., a network address, a signal from an access point, etc.).

The weighing device information acquiring unit 97 acquires, from the server 26, information indicating the location of the weighing device 47 with which the server 26 has established a connection.

The weighing device information displaying unit 98 controls the display device 91 to display information indicating the location of the weighing device 47 acquired by the weighing device information acquiring unit 97.

Figure 16:
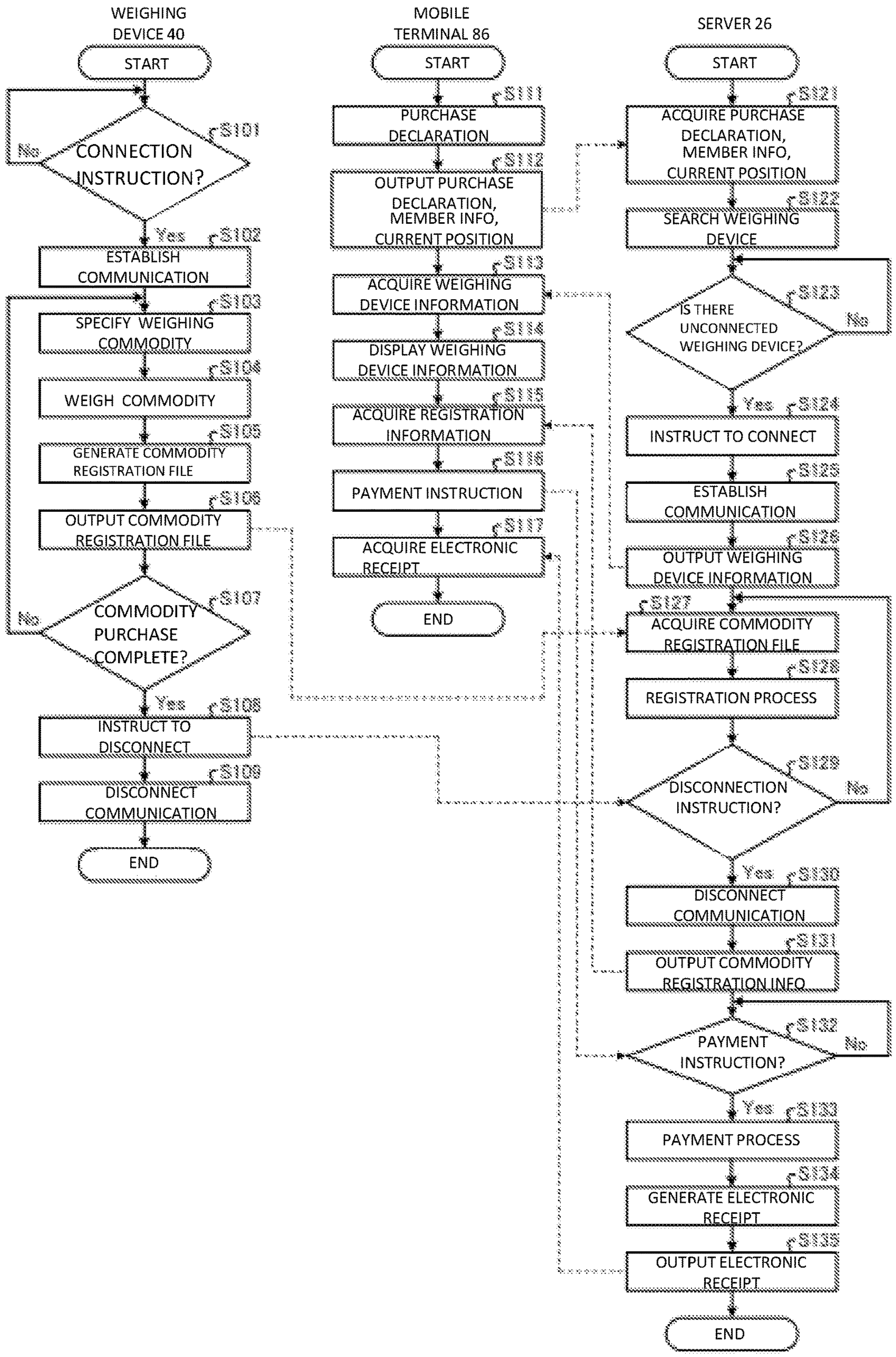
FIG. 16 is a flowchart showing a flow of processing performed by a POS system according to a third embodiment.

A flow of processing performed by the POS system 3 will be described with reference to FIG. 16. FIG. 16 is a flowchart showing a flow of processing performed by the POS system 3.

The flow of the processing performed by the weighing device 47 from step S101 to step S109 is the same as the flow of the processing performed by the weighing device 40 of the first embodiment from step S11 to step S19 in FIG. 9, and thus description thereof will be omitted.

The commodity purchase declaration outputting unit 95 acquires the customer's declaration of declaring the purchase of the weighed commodity (step S111). Specifically, the commodity purchase declaration outputting unit 95 acquires information about an operation made by the customer who declares the purchase of the weighed commodity.

The weighing commodity purchase declaration outputting unit 95 controls the communication interface 94 to output information indicating that the purchase of the weighed commodity is declared to the server 26. In addition, the weighing commodity purchase declaration outputting unit 95 controls the communication interface 94 to output the member information Md to the server 26. The weighing commodity purchase declaration outputting unit 95 also controls the communication interface 94 to output the current location of the mobile device 86 to the server 26 (step S112).

The weighing device information acquiring unit 97 acquires information indicating the location of the weighing device 47 with which the server 26 has established a connection, from the server 26 (step S113).

The weighing device information displaying unit 98 controls the display device 91 to display information indicating the location of the weighing device 47 (step S114). The customer carrying the mobile terminal 86 confirms the information indicating the location of the weighing device 47 displayed on the display device 91, goes to the instructed weighing device 47, and purchases the weighed commodity.

The registration information acquiring unit 74 acquires the commodity registration information from the server 26 (step S115).

The payment instruction outputting unit 75 controls the communication interface 94 to output an execution instruction of the payment process to server 20 (step S116).

The electronic receipt acquiring unit 76 acquires an electronic receipt from the server 20 (step S117). Thereafter, the mobile terminal 80 ends the process of FIG. 16. Although not illustrated in the flowchart of FIG. 16, the display control unit 77 of the mobile terminal 80 controls the display device 91 to display the acquired electronic receipt when receiving an instruction from the user.

The weighed commodity purchase declaration acquiring unit 87 of the server 26 acquires information indicating a declaration that the weighed commodity is purchased from the mobile terminal 86. Further, the member information acquiring unit 10 acquires member information Md from the mobile terminal 86. Further, the mobile device location acquiring unit 88 acquires the current location of the mobile device 86 from the mobile device 86 (step S121).

When the weighing device searching unit 89 acquires the information indicating the declaration of the purchase of the weighed commodity, the weighing device searching unit 89 searches for the weighing device 47 in the vicinity of the mobile device 86 and ready for weighing (step S122).

The weighing device searching unit 89 determines whether there is an unconnected weighing device 47 in the vicinity of the mobile device 86 (step S123). When it is determined that there is an unconnected weighing device 47 in the vicinity of the mobile terminal 86 (step S123:Yes), the process proceeds to step S124. On the other hand, if the weighing device searching unit 89 determines that there is no unconnected weighing device 47 in the vicinity of the mobile device 86 (step S123:No), the processing returns to step S123, and the weighing device searching unit 89 repeatedly executes step S123 until determining YES.

When the weighing device searching unit 89 determines in step S123 that there is an unconnected weighing device 47 in the vicinity of the mobile device 86, the connecting unit 11 instructs the weighing device 47 to connect communication (step S124).

The connecting unit 11 establishes communication with the weighing device 47 (step S125).

The weighing device information outputting unit 90 controls the communication interface 33 to output information indicating the location of the weighing device 47 with which the communication has been established to the mobile device 86 (step S126).

The commodity information acquiring unit 12 acquires the commodity registration file Mc from the weighing device 47 (step S127).

The registration processing unit 13 performs the commodity registration processing based on the contents registered in the commodity registration file Mc (step S128).

The disconnecting unit 17 determines whether there is a communication disconnection instruction from the weighing device 47 (step S129). When the disconnecting unit 17 determines that there is a communication disconnection instruction from the weighing device 47 (step S129:Yes), the process proceeds to step S130. On the other hand, if the disconnecting unit 17 determines that there is no communication disconnection instruction from the weighing device 47 (step S129:No), the processing returns to step S127, and step S127 to step S129 are repeatedly executed until determining YES in step S129.

When it is determined in step S129 that there is an instruction to disconnect the communication from the weighing device 47, the disconnecting unit 17 disconnects the communication with the weighing device 47 (step S130).

The registration information outputting unit 14 controls the communication interface 33 to output the commodity registration information to the mobile device 86 of the customer (step S131).

The payment instruction acquiring unit 15 determines whether a payment instruction has been acquired from the mobile device 86 of the customer (step S132). When it is determined that the payment instruction has been acquired from the mobile device 86 (step S132:Yes), the process proceeds to step S133. On the other hand, when it is not determined that the payment instruction has been acquired from the mobile device 86 (step S132:No), the payment instruction acquiring unit 15 repeats the process of step S132 until determining YES.

When it is determined in step S132 that the payment instruction has been acquired from the mobile device 86, the payment processing unit 16 performs payment processing on the result of the registration processing performed in step S128 (step S133).

The electronic receipt generating unit 18 generates an electronic receipt indicating a result of the payment processing (step S134).

The electronic receipt outputting unit 19 controls the communication interface 33 to output the electronic receipt to the mobile device 86 of the customer (step S135). Thereafter, the server 26 ends the process of FIG. 16.

As described above, the server 26 of the third embodiment includes the weighed commodity purchase declaration acquiring unit 87 that acquires information indicating the declaration that a weighed commodity is purchased from the mobile terminal 86, when the weighed commodity purchase declaration acquiring unit 87 acquires the that information about the purchase of the weighed commodity, the connecting unit 11 searches for a weighing device 47 that is ready for weighing, and establishes communication with the weighing device 47 found. The server 26 further includes the weighing device information outputting unit 90 for transmitting information indicating the location of the weighing device 47 with which communication has been established to the mobile terminal 86, the commodity information acquiring unit 12 that acquires commodity information specifying the weighed commodity and the weight thereof from the weighing device 47, the registration processing unit 13 for registering information acquired by the commodity information acquiring unit 12, the registration information outputting unit 14 that controls the communication interface 33 to output a registration result by the registration processing unit 13 to the mobile terminal 86 associated with the customer who purchases the weighing commodity, the disconnecting unit 17 that disconnects communication with the weighing device 47. Therefore, the customer does not need to operate the mobile terminal 86 to read the code symbol Q including the identification information for uniquely specifying the weighing device 47.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope of the inventions.

What is claimed is:

1. A registration server in a point of sale (POS) system including a weighing device for weighing a commodity that is sold by weight in a store and a mobile terminal operated by a customer for managing one or more registered commodities including the weighed commodity, the registration server comprising:

- a network interface connectable to the weighing device and the mobile terminal;
- a memory; and
- a processor configured to:
  - upon receipt of identification information identifying the weighing device from the mobile terminal, control the network interface to establish a connection with the weighing device,
  - acquire a plurality of pieces of commodity information each indicating a weighed commodity and a weight thereof from the weighing device,
  - register in the memory the weighed commodities as commodities to be purchased by the customer,
  - control the network interface to output the plurality of pieces of commodity information to the mobile terminal,
  - maintain the connection with the weighing device until an instruction for disconnecting the connection is received from the weighing device, and
  - terminate the connection with the weighing device in response to the instruction for disconnecting the connection,
- wherein the processor is further configured to:
  - upon receipt of the identification information from another mobile terminal while the connection is maintained, control the network interface to transmit, to said another mobile terminal, information indicating that a connection with the weighing device cannot be established.

2. The registration server according to claim 1, wherein the processor is further configured to, in response to a payment instruction from the mobile terminal, perform payment processing for the registered commodities.

3. The registration server according to claim 2, wherein the processor is further configured to:

- after the payment instruction is received, generate an electronic receipt including the plurality of pieces of commodity information, and
- control the network interface to output the electronic receipt to the mobile terminal.

4. The registration server according to claim 1, wherein the identification information is displayed on a screen of the weighing device.

5. The registration server according to claim 4, wherein the identification information is displayed in response to a first operation on the weighing device, and is deleted from the screen in response to a second operation on the weighing device.

6. The registration server according to claim 1, wherein the identification information is represented by a two-dimensional code attached to the weighing device and readable by the mobile terminal.

7. A registration server in a point of sale (POS) system including a plurality of weighing devices for weighing a commodity that is sold by weight in a store and a mobile terminal operated by a customer for managing one or more registered commodities including the weighed commodity, the registration server comprising:

- a network interface connectable to the weighing devices and the mobile terminal;
- a memory; and
- a processor configured to:
  - acquire, from the mobile terminal, location information indicating a current location thereof,
  - search for a first weighing device that is ready for weighing a commodity and is closest to the mobile terminal,
  - establish a connection with the first weighing device,
  - control the network interface to transmit, to the mobile terminal, weighing device information indicating the first weighing device,
  - acquire, from the first weighing device, a plurality of pieces of commodity information each indicating a weighed commodity that has been weighed by the first weighing device and a weight of the weighed commodity,
  - register in the memory the weighed commodities as commodities to be purchased by the customer,
  - control the network interface to output the plurality of pieces of commodity information to the mobile terminal,
  - maintain the connection with the first weighing device until an instruction for disconnecting the connection is received from the first weighing device, and
  - terminate the connection with the first weighing device in response to the instruction for disconnecting the connection,
- wherein the processor is further configured to:
  - if none of the plurality of weighing devices are ready for weighing, search fora weighing device that is ready for weighing repeatedly until one of the weighing devices becomes ready for weighing.

8. The registration server according to claim 7, wherein the weighing device information indicates a location of the first weighing device.

9. The registration server according to claim 8, wherein the location of the first weighing device is displayed on the mobile terminal.

10. The registration server according to claim 7, wherein the processor is further configured to, in response to a payment instruction from the mobile terminal, perform payment processing for the registered commodities.

11. The registration server according to claim 10, wherein the processor is further configured to:

- after the payment instruction is received, generate an electronic receipt including the plurality of pieces of commodity information, and
- control the network interface to output the electronic receipt to the mobile terminal.

12. A method performed by a point of sale (POS) system including a registration server, a weighing device for weighing a commodity that is sold by weight in a store, and a mobile terminal operated by a customer for managing one or more registered commodities including the weighed commodity, the method comprising:

transmitting identification information identifying the weighing device from the mobile terminal to the registration server;

in response to receiving the transmitted identification information, establishing a connection between the weighing device and the registration server;

generating by the weighing device a commodity registration file including a plurality of pieces of commodity information each indicating a weighed commodity and a weight thereof before the connection between the weighing device and the registration server is disconnected;

transmitting the commodity registration file including the plurality of pieces of commodity information from the weighing device to the registration server;

registering in a memory of the registration server the weighed commodities as commodities to be purchased by the customer;

outputting the plurality of pieces of commodity information from the registration server to the mobile terminal;

while the connection between the weighing device and the registration server is maintained, transmitting the identification information from another mobile terminal to the registration server and transmitting, from the registration server to said another mobile terminal, information indicating that a connection between the weighing device and the registration server cannot be established;

maintaining the connection between the weighing device and the registration server until an instruction for disconnecting the connection is issued by the weighing device; and terminating the connection with the weighing device in response to the instruction for disconnecting the connection.

13. The method according to claim 12, further comprising:

displaying the identification information on a screen of the weighing device.

14. The method according to claim 13, wherein the displaying includes displaying on the screen of the weighing device a code representing the identification information in response to a first operation on the weighing device, and the method further comprises stopping to display the code in response to a second operation on the weighing device.

15. The method according to claim 14, further comprising:

scanning, with a camera of the mobile terminal, the code displayed on the screen of the weighing device; and decoding, by the mobile terminal, the code to acquire the identification information of the weighing device.

* * * * *